(12) United States Patent
Bae

(10) Patent No.: US 10,523,062 B2
(45) Date of Patent: Dec. 31, 2019

(54) MULTI-MODE WIRELESS POWER TRANSMISSION METHOD AND DEVICE FOR SAME

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 88 days.

(21) Appl. No.: 15/575,708

(22) PCT Filed: Jun. 17, 2016

(86) PCT No.: PCT/KR2016/006468
§ 371 (c)(1),
(2) Date: Nov. 20, 2017

(87) PCT Pub. No.: WO2017/003117
PCT Pub. Date: Jan. 5, 2017

(65) Prior Publication Data
US 2018/0294681 A1    Oct. 11, 2018

(30) Foreign Application Priority Data
Jun. 30, 2015   (KR) .......................... 10-2015-0092824

(51) Int. Cl.
*H01F 38/14* (2006.01)
*H02J 50/70* (2016.01)
(Continued)

(52) U.S. Cl.
CPC .............. *H02J 50/70* (2016.02); *H02J 7/025* (2013.01); *H02J 50/12* (2016.02); *H02J 50/40* (2016.02); *H02J 50/80* (2016.02); *H02J 50/90* (2016.02)

(58) Field of Classification Search
CPC .. H02J 50/80; H02J 50/90; H02J 50/70; H02J 50/12; H02J 50/10; H02J 50/40; H02J 7/025
See application file for complete search history.

(56) References Cited

U.S. PATENT DOCUMENTS 7,187,913 B1 *  3/2007  Rahn ...................... H03J 1/005
                                                           348/731
2011/0127845 A1  6/2011  Walley et al.
(Continued)

FOREIGN PATENT DOCUMENTS

JP        2013-13204 A      1/2013
JP        2014-204630 A    10/2014
(Continued)

*Primary Examiner* — Alfonso Perez Borroto
*Assistant Examiner* — Esayas G Yeshaw
(74) *Attorney, Agent, or Firm* — Birch, Stewart, Kolasch & Birch, LLP

(57) ABSTRACT

The present invention relates to a multi-mode wireless power transmission method and a device for the same. A wireless power transmitter for supporting a plurality of wireless power transmission modes, according to one embodiment of the present invention, can comprise: a first transmitter for transmitting a first power signal corresponding to a first wireless power transmission mode; a second transmitter for transmitting a second power signal corresponding to a second wireless power transmission mode; and a first power cutoff circuit coupled to the first transmitter so as to block the incoming second power signal and allow the first power signal to pass therethrough. Therefore, the present invention can minimize power consumption in the wireless power transmitter supporting the plurality of wireless power transmission modes, and can maximize power transmission efficiency.

17 Claims, 18 Drawing Sheets

(51) Int. Cl.
*H02J 50/40* (2016.01)
*H02J 50/12* (2016.01)
*H02J 50/80* (2016.01)
*H02J 50/90* (2016.01)
*H02J 7/02* (2016.01)

(56) References Cited

U.S. PATENT DOCUMENTS

| | | | | |
|---|---|---|---|---|
| 2011/0260681 | A1* | 10/2011 | Guccione | H02J 7/0054 320/108 |
| 2013/0002035 | A1* | 1/2013 | Oodachi | H04B 5/0037 307/104 |
| 2013/0076306 | A1 | 3/2013 | Lee et al. | |
| 2014/0111153 | A1* | 4/2014 | Kwon | H02J 7/025 320/108 |
| 2014/0167520 | A1 | 6/2014 | Moh et al. | |
| 2015/0008876 | A1 | 1/2015 | Kwak et al. | |
| 2015/0364944 | A1* | 12/2015 | Garcia Briz | H02J 5/005 307/104 |
| 2015/0380988 | A1* | 12/2015 | Chappell | H02J 17/00 307/104 |
| 2016/0254705 | A1* | 9/2016 | Jung | H02J 50/40 307/104 |
| 2017/0047786 | A1* | 2/2017 | Park | H02J 7/02 |

FOREIGN PATENT DOCUMENTS

| | | |
|---|---|---|
| KR | 10-2007-0061233 A | 6/2007 |
| KR | 10-2012-0133322 A | 12/2012 |
| KR | 10-2013-0003965 A | 1/2013 |
| KR | 10-2013-0033867 A | 4/2013 |
| KR | 10-2014-0077591 A | 6/2014 |
| WO | WO 2015/064815 A1 | 5/2015 |

* cited by examiner

MULTI-MODE WIRELESS POWER TRANSMISSION METHOD AND DEVICE FOR SAME

CROSS REFERENCE TO RELATED APPLICATIONS

This application is the National Phase of PCT International Application No. PCT/KR2016/006468, filed on Jun. 17, 2016, which claims priority under 35 U.S.C. 119(a) to Patent Application No. 10-2015-0092824, filed in the Republic of Korea on Jun. 30, 2015, all of which are hereby expressly incorporated by reference into the present application.

TECHNICAL FIELD

Embodiments relate to wireless charging technology, and more particularly, to a multi-mode wireless power transmission method capable of minimizing power loss caused by mutual interference between an induction coil and a resonant coil in a wireless power transmission device that supports both inductive and resonant wireless power transmission schemes and a device for the same.

BACKGROUND ART

Recently, as information and communication technology rapidly develops, a ubiquitous society based on information and communication technology is being formed.

In order for information communication devices to be connected anywhere and anytime, sensors equipped with a computer chip having a communication function should be installed in all facilities throughout the society. Accordingly, power supply to these devices or sensors is becoming a new challenge. In addition, as the types of mobile devices such as Bluetooth handsets and iPods, as well as mobile phones, rapidly increase in number, charging the battery has required time and effort for users. As a way to address this issue, wireless power transmission technology has recently drawn attention.

Wireless power transmission (or wireless energy transfer) is a technology for wirelessly transmitting electric energy from a transmitter to a receiver using the induction principle of a magnetic field. Back in the 1800s, an electric motor or a transformer based on the electromagnetic induction principle began to be used. Thereafter, a method of transmitting electric energy by radiating an electromagnetic wave such as a radio wave or laser was tried. Electric toothbrushes and some wireless shavers are charged through electromagnetic induction.

Up to now, wireless energy transmission schemes may be broadly classified into electromagnetic induction, electromagnetic resonance, and RF transmission using a short-wavelength radio frequency.

In the electromagnetic induction scheme, when two coils are arranged adjacent to each other and a current is applied to one of the coils, a magnetic flux generated at this time generates an electromotive force in the other coil. This technology is being rapidly commercialized mainly for small devices such as mobile phones. In the electromagnetic induction scheme, power of up to several hundred kilowatts (kW) may be transmitted with high efficiency, but the maximum transmission distance is within 1 cm. As a result, the device should be generally arranged adjacent to the charger or the floor.

The electromagnetic resonance scheme uses an electric field or a magnetic field instead of using an electromagnetic wave or current. The electromagnetic resonance scheme is advantageous in that the scheme is safe to other electronic devices or the human body since it is hardly influenced by the electromagnetic wave. However, this scheme may be used only at a limited distance and in a limited space, and has somewhat low energy transfer efficiency.

The short-wavelength wireless power transmission scheme (simply, RF transmission scheme) takes advantage of the fact that energy can be transmitted and received directly in the form of radio waves. This technology is an RF power transmission scheme using a rectenna. A rectenna, which is a compound of antenna and rectifier, refers to a device that converts RF power directly into direct current (DC) power. That is, the RF method is a technology for converting AC radio waves into DC waves. Recently, with improvement in efficiency, commercialization of RF technology has been actively researched.

Wireless power transmission technology may be applied to various industries including IT, railroad, and home appliance industries as well as the mobile industry.

Particularly, in recent years, research on a wireless power transmission device and a wireless power reception device that support a plurality of wireless power transmission schemes has been actively conducted.

For a wireless power transmission device supporting both the electromagnetic induction scheme and the electromagnetic resonance scheme, since a transmission induction coil and a transmission resonant coil are positioned on the same charging bed (or charging pad), mutual interference may be caused by the coupling effect, and accordingly power loss may occur.

DISCLOSURE

Technical Problem

Therefore, the present disclosure has been made in view of the above problems, and embodiments provide a multi-mode wireless power transmission method and a device for the same.

Embodiments further provide a multi-mode wireless power transmission method capable of adaptively blocking mutual interference between a transmission induction coil and a transmission resonant coil in a wireless power transmission device supporting both the electromagnetic induction scheme and the electromagnetic resonance scheme, and a device for the same.

Embodiments further provide a wireless power transmission device having a parallel LC tank for preventing power loss caused by coupling of a magnetic field generated from a transmission resonant coil with a transmission induction coil.

Embodiments further provide a wireless power transmission device having a parallel LC tank for preventing power loss caused by coupling of a magnetic field generated from a transmission induction coil with a transmission resonant coil.

The technical objects that can be achieved through the embodiments are not limited to what has been particularly described hereinabove and other technical objects not described herein will be more clearly understood by persons skilled in the art from the following detailed description.

Technical Solution

The present disclosure may provide a multi-mode wireless power transmission method and a device for the same.

In one embodiment, a wireless power transmitter supporting a plurality of wireless power transmission modes includes a first transmitter configured to transmit a first power signal corresponding to a first wireless power transmission mode, a second transmitter configured to transmit a second power signal corresponding to a second wireless power transmission mode, and a first power interruption circuit coupled to the first transmitter to interrupt introduction of the second power signal and to pass the first power signal.

As an example, the first wireless power transmission mode may be a mode for transmitting wireless power using an electromagnetic induction scheme, and the second wireless power transmission mode may be a mode for transmitting wireless power using an electromagnetic resonance scheme.

As an example, the first wireless power transmission mode may be a mode for transmitting wireless power using an electromagnetic resonance scheme, and the second wireless power transmission mode may be a mode for transmitting wireless power using an electromagnetic induction scheme.

In addition, the first power interruption circuit may include at least one parallel LC tank including an inductor and a capacitor connected in parallel.

When a plurality of transmission coils is provided in the first transmitter, the wireless power transmitter may further include switches corresponding to the number of the transmission coils, wherein the parallel LC tank may be connected to one end of the transmission coils and the switches may be connected to an opposite end of the transmission coils.

In addition, the first power interruption circuit may include a bandpass filter configured to interrupt a power signal in an operating frequency band used in the second transmitter and to pass a power signal in an operating frequency band used in the first transmitter.

Further, the first power interruption circuit may include at least one variable parallel LC tank configured to change an operating frequency band.

The wireless power transmitter may further include a second power interruption circuit configured to interrupt the first power signal coupled to the second transmitter and introduced and to pass the second power signal.

The wireless power transmitter may further include a position sensor configured to sense a position of a wireless power receiver, a controller configured to determine a wireless power transmission mode for the sensed wireless power receiver, and a mode selection switch configured to supply power to a transmitter corresponding to the determined wireless power transmission mode according to a control signal of the controller.

The wireless power transmitter may further include a communication unit configured to receive state and characteristics information from the sensed wireless power receiver, wherein the wireless power transmission mode for the sensed wireless power receiver may be determined based on the state and characteristics information.

In another embodiment, a wireless power transmitter includes a controller, first to k-th wireless power transmission blocks each including an interference power interruption unit configured to prevent the power signal from being coupled through a coil provided with a power signal sent by another wireless power transmission block and introduced into an internal circuit, and a block selection switch configured to supply power to at least one of the first to k-th wireless power transmission blocks according to a control signal of the controller.

Herein, the interference power interruption unit may include at least one parallel LC tank including an inductor and a capacitor connected in parallel.

When a plurality of transmission coils is provided in each of the wireless power transmission blocks, the wireless power transmitter may further include switches corresponding to the number of the transmission coils, wherein the parallel LC tank may be connected to one end of the transmission coils and the switches are connected to an opposite end of the transmission coils.

In addition, the interference power interruption unit may include at least one variable parallel LC tank configured to change an operating frequency band.

Herein, a value of at least one of an inductor and a capacitor of the variable parallel LC tank connected in parallel may be changed.

Each of the wireless power transmission blocks may further include an inverter configured to change an intensity of the power signal transmitted according to a control signal of the controller, a transmission coil unit having a plurality of transmission coils for wirelessly transmitting the power signal, and a multiplexer configured to multiplex the power signal received from the inverter to the plurality of transmission coils.

In another embodiment, a method for wireless power transmission in a wireless power transmitter having first and second transmitters includes sensing a position of a wireless power receiver in a charging area, transmitting a first power signal using the first transmitter corresponding to the sensed position, and interrupting the first power signal introduced into the second transmitter.

Herein, the first power signal introduced into the second transmitter may be interrupted using at least one parallel LC tank having an inductor and a capacitor connected in parallel.

In this case, an inductance value of the inductor and a capacitance value of the capacitor may be set so as to pass a second power signal transmitted by the second transmitter and to interrupt the first power signal.

The method may further include transmitting a second power signal using the second transmitter corresponding to the sensed position, and interrupting the second power signal introduced into the first transmitter.

In another embodiment, a program for executing any one of the methods above and a computer-readable recording medium having the program recorded thereon may be provided.

The above-described aspects of the present disclosure are merely a part of preferred embodiments of the present disclosure. Those skilled in the art will derive and understand various embodiments reflecting the technical features of the present disclosure from the following detailed description of the present disclosure.

Advantageous Effects

The method and device according to the embodiments have the following effects.

The present embodiment has the advantage of providing a multimode wireless power transmission method and apparatus therefor that are capable of minimizing power loss.

The present embodiment also relates to a multi-mode wireless power transmission method capable of adaptively blocking mutual interference between a transmission induction coil and a transmission resonant coil in a wireless power transmission device supporting both an electromagnetic induction system and an electromagnetic resonance system.

In addition, the present embodiment has an advantage of providing a wireless power transmission device provided with a parallel LC tank for blocking power loss caused by a coupling of a magnetic field generated from a transmission resonant coil to a transmission induction coil.

It is another advantage of the present embodiment to provide a wireless power transmission device provided with a parallel LC tank for shielding power loss generated by coupling a magnetic field generated in a transmission induction coil to a transmission resonant coil.

Further, by minimizing mutual interference between the transmission induction coil and the transmission resonant coil through the multi-mode wireless power transmission device according to the present embodiment, not only may power transmission efficiency be maximized, but also charging time may be minimized.

It will be appreciated by those skilled in the art that that the effects that can be achieved through the embodiments of the present disclosure are not limited to those described above and other advantages of the present disclosure will be more clearly understood from the following detailed description.

DESCRIPTION OF DRAWINGS

The accompanying drawings, which are included to provide a further understanding of the invention and are incorporated in and constitute a part of this application, illustrate embodiments of the disclosure and together with the description serve to explain the principle of the disclosure. In the drawings.

BEST MODE

Figure 1:
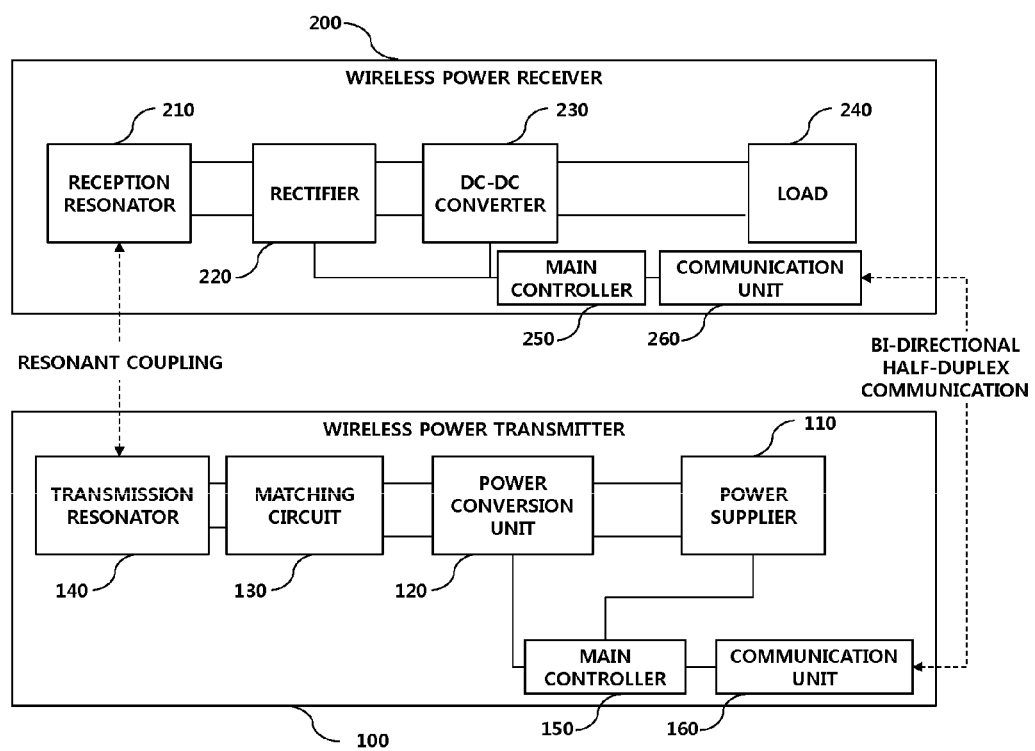
FIG. 1 is a system configuration diagram illustrating a wireless power transmission method using an electromagnetic resonance scheme according to an embodiment of the present disclosure.

A wireless power transmitter supporting a plurality of wireless power transmission modes according to a first embodiment of the present disclosure includes a first transmitter for transmitting a first power signal corresponding to a first wireless power transmission mode, a second transmitter for transmitting a second power signal corresponding to a second wireless power transmission mode, and a first power interruption circuit for blocking the second power signal input by being coupled to the first transmitter and for passing the first power signal.

MODE FOR INVENTION

Hereinafter, an apparatus and various methods to which embodiments of the present disclosure are applied will be described in detail with reference to the drawings. As used herein, the suffixes "module" and "unit" are added or used interchangeably to facilitate preparation of this specification and are not intended to suggest distinct meanings or functions.

In the description of the embodiments, it is to be understood that when an element is described as being "on" or "under" another element, it can be "directly" on or under another element or can be "indirectly" formed such that one or more other intervening elements are also present between the two elements. In addition, when an element is described as being "on" or "under," the term "on" or "under" may refer to not only the upper side but also the lower side with respect to the element.

In the description of the embodiments, "wireless power transmitter," "wireless power transmission device," "transmission terminal," "transmitter," "transmission device," "transmission side," and the like will be interchangeably used to refer to a device for transmitting wireless power in a wireless power system, for simplicity.

In addition, "wireless power reception device," "wireless power receiver," "reception terminal," "reception side," "reception device," "receiver," and the like will be interchangeably used to refer to a device for receiving wireless power from a wireless power transmission device, for simplicity.

The wireless power transmitter according to the present disclosure may be configured as a pad type, a cradle type, an access point (AP) type, a small base station type, a stand type, a ceiling embedded type, a wall-mounted type, a vehicle embedded type, a vehicle resting type, or the like. One transmitter may transmit power to a plurality of wireless power reception devices at the same time.

To this end, the wireless power transmitter may provide at least one wireless power transmission scheme, including, for example, an electromagnetic induction scheme, an electromagnetic resonance scheme, and the like.

For example, for the wireless power transmission schemes, various wireless power transmission standards based on an electromagnetic induction scheme for charging using an electromagnetic induction principle in which a magnetic field is generated in a power transmission terminal coil and electricity is induced in a reception terminal coil by the influence of the magnetic field may be used. Here, the electromagnetic induction type wireless power transmission standards may include an electromagnetic induction type wireless charging technique defined in a Wireless Power Consortium (WPC) technique or a Power Matters Alliance (PMA) technique.

In another example, a wireless power transmission scheme may employ an electromagnetic resonance scheme in which a magnetic field generated by a transmission coil of a wireless power transmitter is tuned to a specific resonant frequency and power is transmitted to a wireless power receiver located at a short distance therefrom. For example, the electromagnetic resonance scheme may include a resonance type wireless charging technique defined in Alliance for Wireless Power (A4WP), which is a wireless charging technology standard organization.

In another example, a wireless power transmission scheme may employ an RF wireless power transmission scheme in which low power energy is transmitted to a wireless power receiver located at a remote location over an RF signal.

In another example of the present disclosure, the wireless power transmitter according to the present disclosure may be designed to support at least two wireless power transmission schemes among the electromagnetic induction scheme, the electromagnetic resonance scheme, and the RF wireless power transmission scheme.

In this case, the wireless power transmitter may determine not only a wireless power transmission scheme that the wireless power transmitter and the wireless power receiver are capable of supporting, but also a wireless power transmission scheme which may be adaptively used for the wireless power receiver based on the type, state, required power, etc. of the wireless power receiver.

A wireless power receiver according to an embodiment of the present disclosure may be provided with at least one wireless power transmission scheme, and may simultaneously receive wireless powers from two or more wireless power transmitters. Here, the wireless power transmission scheme may include at least one of the electromagnetic induction scheme, the electromagnetic resonance scheme, and the RF wireless power transmission scheme.

The wireless power receiver according to the present disclosure may be embedded in small electronic devices such as a mobile phone, a smartphone, a laptop computer, a digital broadcast terminal, a PDA (Personal Digital Assistant), a PMP (Portable Multimedia Player), a navigation system, an MP3 player, an electric toothbrush, an electronic tag, a lighting device, a remote control, a fishing float, and the like. However, embodiments are not limited thereto, and the wireless power receiver may be applied to any devices which may be provided with the wireless power receiving means according to the present disclosure and be charged through a battery. A wireless power receiver according to another embodiment of the present disclosure may be mounted even on a vehicle, an unmanned aerial vehicle, a drone, and the like.

FIG. 1 is a system configuration diagram illustrating a wireless power transmission method using an electromagnetic resonance scheme according to an embodiment of the present disclosure.

Referring to FIG. 1, a wireless power transmission system may include a wireless power transmitter 100 and a wireless power receiver 200.

While FIG. 1 illustrates that the wireless power transmitter 100 transmits wireless power to one wireless power receiver 200, this is merely one embodiment, and the wireless power transmitter 100 according to another embodiment of the present disclosure may transmit wireless power to a plurality of wireless power receivers 200. It should be noted that the wireless power receiver 200 according to yet another embodiment may simultaneously receive wireless power from a plurality of wireless power transmitters 100.

The wireless power transmitter 100 may generate a magnetic field using a specific power transmission frequency (for example, a resonant frequency) to transmit power to the wireless power receiver 200.

The wireless power receiver 200 can receive power by tuning to the same frequency as the power transmission frequency used by the wireless power transmitter 100.

As an example, the frequency used for power transmission may be, but is not limited to, a 6.78 MHz band.

That is, the power transmitted by the wireless power transmitter 100 may be communicated to the wireless power receiver 200 that is in resonance with the wireless power transmitter 100.

The maximum number of wireless power receivers 200 capable of receiving power from one wireless power transmitter 100 may be determined based on the maximum transmit power level of the wireless power transmitter 100, the maximum power reception level of the wireless power receiver 200, and the physical structures of the wireless power transmitter 100 and the wireless power receiver 200.

The wireless power transmitter 100 and the wireless power receiver 200 can perform bidirectional communication in a frequency band different from the frequency band for wireless power transmission, i.e., the resonant frequency band. As an example, bidirectional communication may employ, without being limited to, a half-duplex Bluetooth low energy (BLE) communication protocol.

The wireless power transmitter 100 and the wireless power receiver 200 may exchange the characteristics and state information on each other including, for example, power negotiation information for power control via bidirectional communication.

As an example, the wireless power receiver 200 may transmit predetermined power reception state information for controlling the level of power received from the wireless power transmitter 100 to the wireless power transmitter 100 via bidirectional communication. The wireless power transmitter 100 may dynamically control the transmit power level based on the received power reception state information. Thereby, the wireless power transmitter 100 may not only optimize the power transmission efficiency, but also provide a function of preventing load breakage due to overvoltage, a function of preventing power from being wasted due to under-voltage, and the like.

The wireless power transmitter 100 may also perform functions such as authenticating and identifying the wireless power receiver 200 through bidirectional communication, identifying incompatible devices or non-rechargeable objects, identifying a valid load, and the like.

Hereinafter, a wireless power transmission process according to the resonance scheme will be described in more detail with reference to FIG. 1.

The wireless power transmitter 100 may include a power supplier 110, a power conversion unit 120, a matching circuit 130, a transmission resonator 140, a main controller 150, and a communication unit 160. The communication unit may include a data transmitter and a data receiver.

The power supplier 110 may supply a specific supply voltage to the power conversion unit 120 under control of the main controller 150. The supply voltage may be a DC voltage or an AC voltage.

The power conversion unit 120 may convert the voltage received from the power supplier 110 into a specific voltage under control of the main controller 150. To this end, the power conversion unit 120 may include at least one of a DC/DC converter, an AC/DC converter, and a power amplifier.

The matching circuit 130 is a circuit that matches impedances between the power conversion unit 120 and the transmission resonator 140 to maximize power transmission efficiency.

The transmission resonator 140 may wirelessly transmit power using a specific resonant frequency according to the voltage applied from the matching circuit 130.

The wireless power receiver 200 may include a reception resonator 210, a rectifier 220, a DC-DC converter 230, a load 240, a main controller 250 and a communication unit 260. The communication unit may include a data transmitter and a data receiver.

The reception resonator 210 may receive power transmitted by the transmission resonator 140 through the resonance effect.

The rectifier 220 may function to convert the AC voltage applied from the reception resonator 210 into a DC voltage.

The DC-DC converter 230 may convert the rectified DC voltage into a specific DC voltage required by the load 240.

The main controller 250 may control the operation of the rectifier 220 and the DC-DC converter 230 or may generate the characteristics and state information on the wireless power receiver 200 and control the communication unit 260 to transmit the characteristics and state information on the wireless power receiver 200 to the wireless power transmitter 100. For example, the main controller 250 may monitor the intensities of the output voltage and current from the rectifier 220 and the DC-DC converter 230 to control the operation of the rectifier 220 and the DC-DC converter 230.

The intensity information on the monitored output voltage and current may be transmitted to the wireless power transmitter 100 through the communication unit 260.

In addition, the main controller 250 may compare the rectified DC voltage with a predetermined reference voltage and determine whether the voltage is in an overvoltage state or an under-voltage state. When a system error state is sensed as a result of the determination, the controller 250 may transmit the sensed result to the wireless power transmitter 100 through the communication unit 260.

When the system error state is sensed, the main controller 250 may control the operation of the rectifier 220 and the DC-DC converter 230 or control the power applied to the load 240 using a predetermined overcurrent interruption circuit including a switch or (and) a Zener diode, in order to prevent the load from being damaged.

In FIG. 1, the main controller 150 or 250 and the communication unit 160 or 260 of each of the transmitter and the receiver are shown as being configured as different modules, but this is merely one embodiment. It is to be noted that the main controller 150 or 250 and the communication unit 160 or 260 may be configured as a single module.

When an event such as addition of a new wireless power receiver to a charging area during charging, disconnection of a wireless power receiver that is being charged, completion of charging of the wireless power receiver, or the like is sensed, the wireless power transmitter 100 according to an embodiment of the present disclosure may perform a power redistribution procedure for the remaining wireless power receivers to be charged. The result of power redistribution may be transmitted to the connected wireless power receiver(s) via out-of-band communication.

Figure 2:
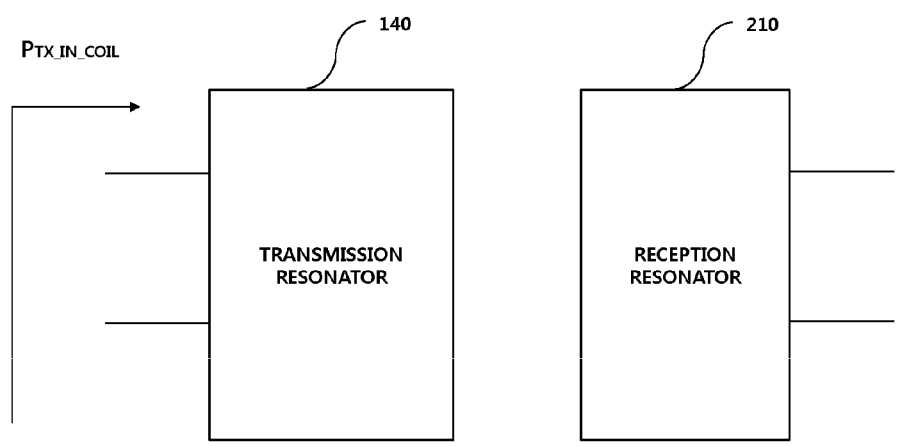
FIG. 2 is a diagram illustrating a type and characteristics of a wireless power transmitter in an electromagnetic resonance scheme according to an embodiment of the present disclosure.

FIG. 2 is a diagram illustrating a type and characteristics of a wireless power transmitter in an electromagnetic resonance scheme according to an embodiment of the present disclosure.

Types and characteristics of the wireless power transmitter and the wireless power receiver according to the present disclosure may be classified into classes and categories.

The type and characteristics of the wireless power transmitter may be broadly identified by the following three parameters.

First, the wireless power transmitter may be identified by a class determined according to the intensity of the maximum power applied to the transmission resonator 140.

Here, the class of the wireless power transmitter may be determined by comparing the maximum value of the power $P_{TX\_IN\_COIL}$ applied to the transmission resonator 140 with a predefined maximum input power for each class specified in a wireless power transmitter class table (hereinafter, referred to as Table 1). Here, $P_{TX\_IN\_COIL}$ may be an average real number value calculated by dividing the product of the voltage V(t) and the current I(t) applied to the transmission resonator 140 for a unit time by the unit time.

TABLE 1

| Class | Maximum input power | Minimum category support requirements | Maximum number of supportable devices |
|---|---|---|---|
| Class 1 | 2 W | 1 × Class 1 | 1 × Class 1 |
| Class 2 | 10 W | 1 × Class 3 | 2 × Class 2 |
| Class 3 | 16 W | 1 × Class 4 | 2 × Class 3 |
| Class 4 | 33 W | 1 × Class 5 | 3 × Class 3 |
| Class 5 | 50 W | 1 × Class 6 | 4 × Class 3 |
| Class 6 | 70 W | 1 × Class 6 | 5 × Class 3 |

The classes shown in Table 1 are merely an embodiment, and new classes may be added or existing classes may be deleted. It should also be noted that the maximum input power for each class, the minimum category support requirements, and the maximum number of supportable devices may vary depending on the use, shape, and implementation of the wireless power transmitter.

For example, referring to Table 1, when the maximum value of the power $P_{TX\_IN\_COIL}$ applied to the transmission resonator 140 is greater than or equal to the value of $P_{TX\_IN\_MAX}$ corresponding to Class 3 and less than the value of $P_{TX\_IN\_MAX}$ corresponding to Class 4, the class of the wireless power transmitter may be determined as Class 3.

Second, the wireless power transmitter may be identified according to the minimum category support requirements corresponding to the identified class.

Here, the minimum category support requirement may be a supportable number of wireless power receivers corresponding to the highest level category of the wireless power receiver categories which may be supported by the wireless power transmitter of the corresponding class. That is, the minimum category support requirement may be the minimum number of maximum category devices which may be supported by the wireless power transmitter. In this case, the wireless power transmitter may support wireless power receivers of all categories lower than or equal to the maximum category according to the minimum category requirement.

However, if the wireless power transmitter is capable of supporting a wireless power receiver of a category higher than the category specified in the minimum category support requirement, the wireless power transmitter may not be restricted from supporting the wireless power receiver.

For example, referring to Table 1, a wireless power transmitter of Class 3 should support at least one wireless power receiver of Category 5. Of course, in this case, the wireless power transmitter may support a wireless power receiver 100 that falls into a category lower than the category level corresponding to the minimum category support requirement.

It should also be noted that the wireless power transmitter may support a wireless power receiver of a higher level category if it is determined that the category whose level is higher than the category corresponding to the minimum category support requirement can be supported.

Third, the wireless power transmitter may be identified by the maximum number of supportable devices corresponding to the identified class. Here, the maximum number of supportable devices may be identified by the maximum number of supportable wireless power receivers corresponding to the lowest level category among the categories which are supportable in the class—hereinafter, simply referred to as the maximum number of supportable devices.

For example, referring to Table 1, the wireless power transmitter of Class 3 should support up to two wireless power receivers corresponding to Category 3 which is the lowest level category.

However, when the wireless power transmitter is capable of supporting more than the maximum number of devices corresponding to its own class, it is not restricted from supporting more than the maximum number of devices.

The wireless power transmitter according to the present disclosure must perform wireless power transmission within the available power for at least up to the number defined in Table 1 if there is no particular reason not to allow the power transmission request from the wireless power receivers.

In one example, if there is not enough available power to accept the power transmission request the wireless power transmitter may not accept a power transmission request from the wireless power receiver. Alternatively, it may control power adjustment of the wireless power receiver.

In another example, when the wireless power transmitter accepts a power transmission request, it may not accept a power transmission request from a corresponding wireless power receiver if the number of acceptable wireless power receivers is exceeded.

In another example, the wireless power transmitter may not accept a power transmission request from a wireless power receiver if the category of the wireless power receiver requesting power transmission exceeds a category level that is supportable in the class of the wireless power transmitter.

In another example, the wireless power transmitter may not accept a power transmission request of the wireless power receiver if the internal temperature thereof exceeds a reference value.

In particular, the wireless power transmitter according to the present disclosure may perform the power redistribution procedure based on the currently available power. The power redistribution procedure may be performed further considering at least one of a category, a wireless power reception state, a required power, a priority, and a consumed power of a wireless power receiver for power transmission, which will be described later.

Information on the at least one of the category, wireless power reception state, required power, priority, and consumed power of the wireless power receiver may be transmitted from the wireless power receiver to the wireless power transmitter through at least one control signal over an out-of-band communication channel.

Once the power redistribution procedure is completed, the wireless power transmitter may transmit the power redistribution result to the corresponding wireless power receiver via out-of-band communication.

The wireless power receiver may recalculate the estimated time required to complete charging based on the received power redistribution result and transmit the re-calculation result to the microprocessor of a connected electronic device. Subsequently, the microprocessor may control the display provided to the electronic device to display the recalculated estimated charging completion time. At this time, the displayed estimated charging completion time may be controlled so as to disappear after being displayed for a predetermined time.

According to another embodiment of the present disclosure, when the estimated time required to complete charging is recalculated, the microprocessor may control the recalculated estimated charging completion to be displayed together with information on the reason for re-calculation. To this end, the wireless power transmitter may also transmit the information on the reason for occurrence of power redistribution to the wireless power receiver when transmitting the power redistribution result.

Figure 3:
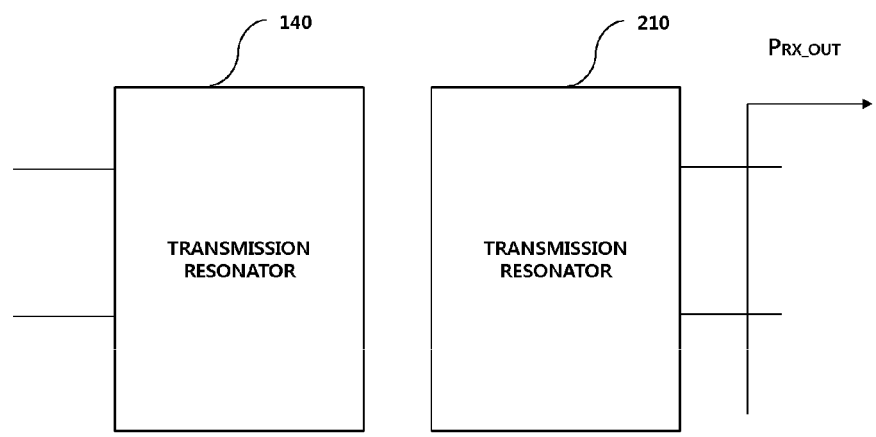
FIG. 3 is a diagram illustrating a type and characteristics of a wireless power receiver in an electromagnetic resonance scheme according to an embodiment of the present disclosure.

FIG. 3 is a diagram illustrating a type and characteristics of a wireless power receiver in an electromagnetic resonance scheme according to an embodiment of the present disclosure.

As shown in FIG. 3, the average output power $P_{RX\_OUT}$ of the reception resonator 210 is a real number value calculated by dividing the product of the voltage V(t) and the current I(t) output by the reception resonator 210 for a unit time by the unit time.

The category of the wireless power receiver may be defined based on the maximum output power $P_{RX\_OUT\_MAX}$ of the reception resonator 210, as shown in Table 2 below.

TABLE 2

| Category | Maximum input power | Application example |
|---|---|---|
| Category 1 | TBD | Bluetooth handset |
| Category 2 | 3.5 W | Feature phone |
| Category 3 | 6.5 W | Smartphone |
| Category 4 | 13 W | Tablet |
| Category 5 | 25 W | Small laptop |
| Category 6 | 37.5 W | Laptop |
| Category 6 | 50 W | TBD |

For example, if the charging efficiency at the load stage is 80% or more, the wireless power receiver of Category 3 may supply power of 5 W to the charging port of the load.

The categories disclosed in Table 2 are merely an embodiment, and new categories may be added or existing categories may be deleted. It should also be noted that the maximum output power for each category and application examples shown in Table 2 may vary depending on the use, shape and implementation of the wireless power receiver.

Figure 4:
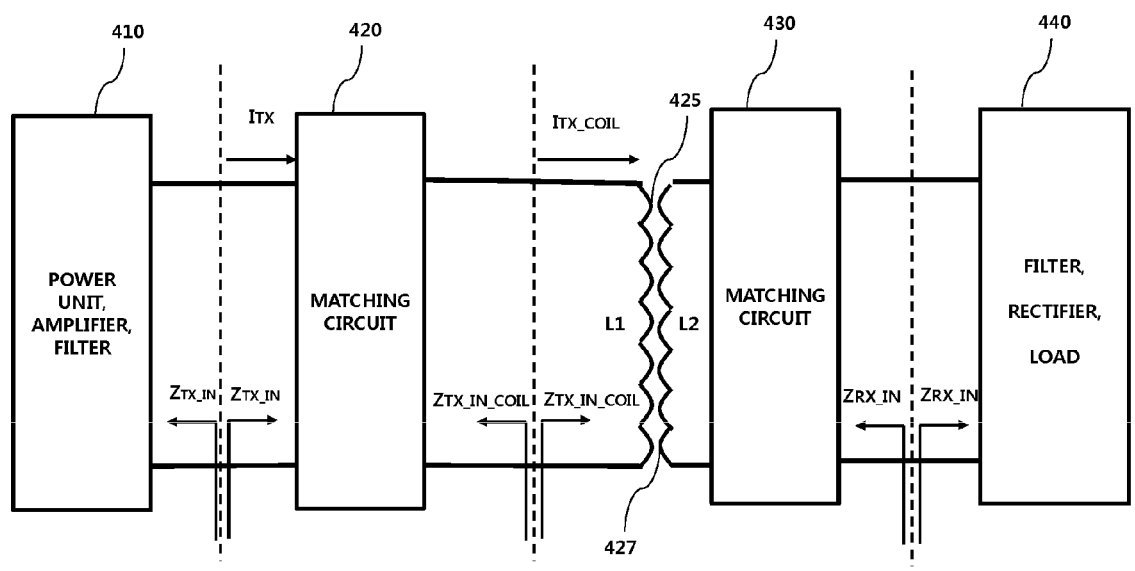
FIG. 4 shows equivalent circuit diagrams of a wireless power transmission system in an electromagnetic resonance scheme according to an embodiment of the present disclosure.

FIG. 4 shows equivalent circuit diagrams of a wireless power transmission system in an electromagnetic resonance scheme according to an embodiment of the present disclosure.

Specifically, FIG. 4 shows interface points on the equivalent circuit at which reference parameters, which will be described later, are measured.

Hereinafter, meanings of the reference parameters shown in FIG. 4 will be briefly described.

$I_{TX}$ and $I_{TX\_COIL}$ denote the RMS (Root Mean Square) current applied to the matching circuit (or matching network) 420 of the wireless power transmitter and the RMS current applied to the transmission resonator coil 425 of the wireless power transmitter.

$Z_{TX\_IN}$ denotes the input impedance at the rear end of the power unit/amplifier/filter 410 of the wireless power transmitter and the input impedance at the front end of the matching circuit 420.

$Z_{TX\_IN\_COIL}$ denotes the input impedance at the rear end of the matching circuit 420 and the front end of the transmission resonator coil 425.

L1 and L2 denote the inductance value of the transmission resonator coil 425 and the inductance value of the reception resonator coil 427, respectively.

$Z_{RX\_IN}$ denotes the input impedance at the rear end of the matching circuit 430 of the wireless power receiver and the front end of the filter/rectifier/load 440 of the wireless power receiver.

The resonant frequency used in the operation of the wireless power transmission system according to an embodiment of the present disclosure may be 6.78 MHz±15 kHz.

In addition, the wireless power transmission system according to an embodiment may provide simultaneous charging (i.e., multi-charging) for a plurality of wireless power receivers. In this case, even if a wireless power receiver is newly added or removed, the received power variation of the remaining wireless power receivers may be controlled so as not to exceed a predetermined reference value. For example, the received power variation may be ±10%, but embodiments are not limited thereto. If it is not possible to control the received power variation not to exceed the reference value, the wireless power transmitter may not accept the power transmission request from the newly added wireless power receiver.

The condition for maintaining the received power variation is that the existing wireless power receivers should not overlap a wireless power receiver that is added to or removed from the charging area.

When the matching circuit 430 of the wireless power receiver is connected to the rectifier, the real part of $Z_{TX\_IN}$ may be inversely proportional to the load resistance of the rectifier-hereinafter, referred to as $R_{RECT}$. That is, an increase in $R_{RECT}$ may decrease $Z_{TX\_IN}$, and a decrease in $R_{RECT}$ may increase $Z_{TX\_IN}$.

The resonator coupling efficiency according to the present disclosure may be a maximum power reception ratio calculated by dividing the power transmitted from the reception resonator coil to the load 440 by the power carried in the resonant frequency band in the transmission resonator coil 425. The resonator coupling efficiency between the wireless power transmitter and the wireless power receiver may be calculated when the reference port impedance $Z_{TX\_IN}$ of the transmission resonator and the reference port impedance $Z_{RX\_IN}$ of the reception resonator are perfectly matched.

Table 3 below is an example of the minimum resonator coupling efficiencies according to the classes of the wireless power transmitter and the classes of the wireless power receiver according to an embodiment of the present disclosure.

TABLE 3

| | Category 1 | Category 2 | Category 3 | Category 4 | Category 5 | Category 6 | Category 7 |
|---|---|---|---|---|---|---|---|
| Class 1 | N/A | N/A | N/A | N/A | N/A | N/A | N/A |
| Class 2 | N/A | 74% (−1.3) | 74% (−1.3) | N/A | N/A | N/A | N/A |
| Class 3 | N/A | 74% (−1.3) | 74% (−1.3) | 76% (−1.2) | N/A | N/A | N/A |
| Class 4 | N/A | 50% (−3) | 65% (−1.9) | 73% (−1.4) | 76% (−1.2) | N/A | N/A |
| Class 5 | N/A | 40% (−4) | 60% (−2.2) | 63% (−2) | 73% (−1.4) | 76% (−1.2) | N/A |
| Class 5 | N/A | 30% (−5.2) | 50% (−3) | 54% (−2.7) | 63% (−2) | 73% (−1.4) | 76% (−1.2) |

When a plurality of wireless power receivers is used, the minimum resonator coupling efficiencies corresponding to the classes and categories shown in Table 3 may increase.

Figure 5:
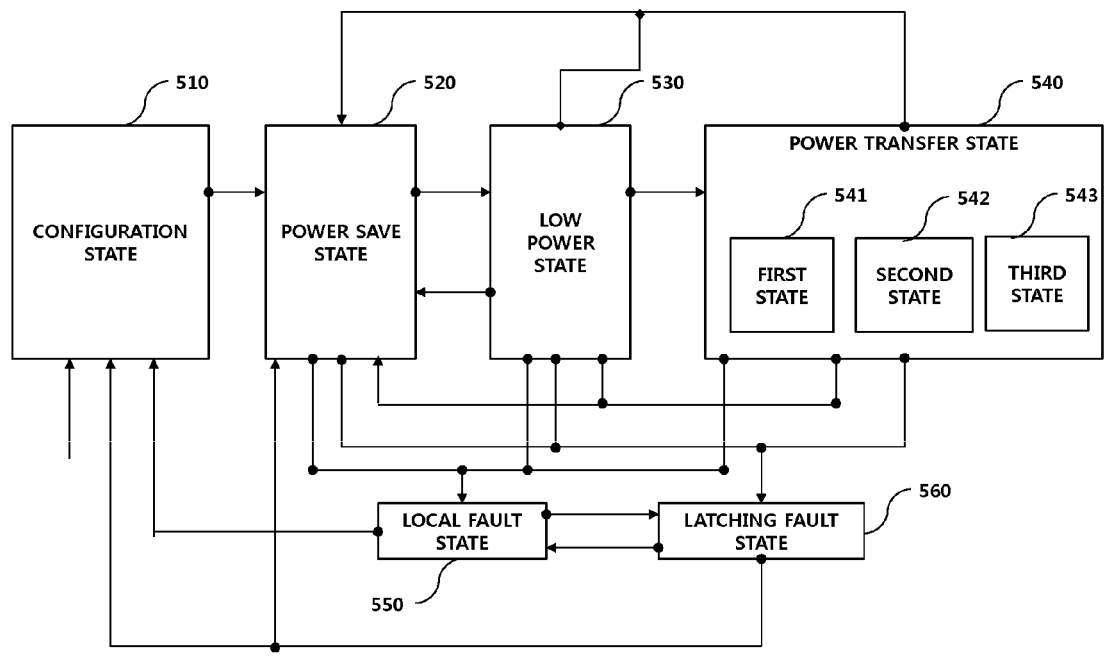
FIG. 5 is a state transition diagram illustrating a state transition procedure of a wireless power transmitter in an electromagnetic resonance scheme according to an embodiment of the present disclosure.

FIG. 5 is a state transition diagram illustrating a state transition procedure of a wireless power transmitter that supports the electromagnetic resonance scheme according to an embodiment of the present disclosure.

Referring to FIG. 5, the states of the wireless power transmitter may include a configuration state 510, a power save state 520, a low power state 530, a power transfer state 540, a local fault state 550, and a latching fault state 560.

When power is applied to the wireless power transmitter, the wireless power transmitter may transition to the configuration state 510. The wireless power transmitter may transition to a power save state 520 when a predetermined reset timer expires in the configuration state 510 or the initialization procedure is completed.

In the power save state 520, the wireless power transmitter may generate a beacon sequence and transmit the same through a resonant frequency band.

Here, the wireless power transmitter may control the beacon sequence to be initiated within a predetermined time after entering the power save state 520. For example, the wireless power transmitter may control the beacon sequence to be initiated within 50 ms after transition to the power save state 520. However, embodiments are not limited thereto.

In the power save state 520, the wireless power transmitter may periodically generate and transmit a first beacon sequence for sensing a wireless power receiver, and sense change in impedance of the reception resonator, that is, load variation. Hereinafter, for simplicity, the first beacon and the first beacon sequence will be referred to as a short beacon and a short beacon sequence, respectively.

In particular, the short beacon sequence may be repeatedly generated and transmitted at a constant time interval $t_{CYCLE}$ during a short period $t_{SHORT\_BEACON}$ such that the standby power of the wireless power transmitter may be saved until a wireless power receiver is sensed. For example, $t_{SHORT\_BEACON}$ may be set to 30 ms or less, and $t_{CYCLE}$ may be set to 250 ms±5 ms. In addition, the current intensity of the short beacon may be greater than a predetermined reference value, and may be gradually increased during a predetermined time period. For example, the minimum current intensity of the short beacon may be set to be sufficiently large such that a wireless power receiver of Category 2 or a higher category in Table 2 above may be sensed.

The wireless power transmitter according to the present disclosure may be provided with a predetermined sensing means for sensing change in reactance and resistance of the reception resonator according to the short beacon.

In addition, in the power save state 520, the wireless power transmitter may periodically generate and transmit a second beacon sequence for providing sufficient power necessary for the booting and response of the wireless power receiver. Hereinafter, for simplicity, the second beacon and the second beacon sequence will be referred to as a long beacon and a long beacon sequence, respectively.

That is, the wireless power receiver may broadcast a predetermined response signal over an out-of-band communication channel when booting is completed through the second beacon sequence.

In particular, the long beacon sequence may be generated and transmitted at a constant time interval $t_{LONG\_BEACON\_PERIOD}$ during a relatively long period $t_{LONG\_BEACON}$ compared to the short beacon to supply sufficient power necessary for booting the wireless power receiver. For example, $t_{LONG\_BEACON}$ may be set to 105 ms+5 ms, and $t_{LONG\_BEACON\_PERIOD}$ may be set to 850 ms. The current intensity of the long beacon may be stronger than the current intensity of the short beacon. In addition, the long beacon may maintain the power of a certain intensity during the transmission period.

Thereafter, the wireless power transmitter may wait to receive a predetermined response signal during the long beacon transmission period after change in impedance of the reception resonator is sensed. Hereinafter, for simplicity, the response signal will be referred to as an advertisement signal. Here, the wireless power receiver may broadcast the advertisement signal in an out-of-band communication frequency band that is different from the resonant frequency band.

In one example, the advertisement signal may include at least one or any one of message identification information for identifying a message defined in the out-of-band communication standard, a unique service or wireless power receiver identification information for identifying whether the wireless power receiver is legitimate or compatible with the wireless power transmitter, information about the output power of the wireless power receiver, information about the rated voltage/current applied to the load, antenna gain information about the wireless power receiver, information for identifying the category of the wireless power receiver, wireless power receiver authentication information, information about whether or not the overvoltage protection function is provided, and version information about the software installed on the wireless power receiver.

Upon receiving the advertisement signal, the wireless power transmitter may establish an out-of-band communication link with the wireless power receiver after transitioning from the power save state 520 to the low power state 530. Subsequently, the wireless power transmitter may perform the registration procedure for the wireless power receiver over the established out-of-band communication link. For example, if the out-of-band communication is Bluetooth low-power communication, the wireless power transmitter may perform Bluetooth pairing with the wireless power receiver and exchange at least one of the state information, characteristic information, and control information about each other via the paired Bluetooth link.

If the wireless power transmitter transmits a predetermined control signal for initiating charging via out-of-band communication, i.e., a predetermined control signal for requesting that the wireless power receiver transmit power to the load, to the wireless power receiver in the low power state 530, the state of the wireless power transmitter may transition from the low power state 530 to the power transfer state 540.

If the out-of-band communication link establishment procedure or registration procedure is not normally completed in the low power state 530, the wireless power transmitter may transition from the low power state 530 to the power save state 520.

A separate independent link expiration timer by which the wireless power transmitter may connect to each wireless power receiver may be driven, and the wireless power receiver may transmit a predetermined message for announcing its presence to the wireless power transmitter in a predetermined time cycle before the link expiration timer expires. The link expiration timer is reset each time the message is received. If the link expiration timer does not expire, the out-of-band communication link established between the wireless power receiver and the wireless power receiver may be maintained.

If all of the link expiration timers corresponding to the out-of-band communication link established between the wireless power transmitter and the at least one wireless power receiver have expired in the low power state 530 or the power transfer state 540, the wireless power transmitter may transition to the power save state 520.

In addition, the wireless power transmitter in the low power state 530 may drive a predetermined registration timer when a valid advertisement signal is received from the wireless power receiver. When the registration timer expires, the wireless power transmitter in the low power state 530 may transition to the power save state 520. At this time, the wireless power transmitter may output a predetermined notification signal notifying that registration has failed through a notification display means (including, for example, an LED lamp, a display screen, and a beeper) provided in the wireless power transmitter.

Further, in the power transfer state 540, when charging of all connected wireless power receivers is completed, the wireless power transmitter may transition to the low power state 530.

In particular, the wireless power receiver may allow registration of a new wireless power receiver in states other than the configuration state 510, the local fault state 550, and the latching fault state 560.

In addition, the wireless power transmitter may dynamically control the transmit power based on the state information received from the wireless power receiver in the power transfer state 540.

Here, the receiver state information transmitted from the wireless power receiver to the wireless power transmitter may include at least one of required power information, information on the voltage and/or current measured at the rear end of the rectifier, charge state information, information for notifying the overcurrent, overvoltage and/or overheated state, and information indicating whether or not a means for cutting off or reducing power transferred to the load according to the overcurrent or the overvoltage is activated. The receiver state information may be transmitted with a predetermined periodicity or transmitted every time a specific event is generated. In addition, the means for cutting off or reducing the power transferred to the load according to the overcurrent or overvoltage may be provided using at least one of an ON/OFF switch and a Zener diode.

According to another embodiment, the receiver state information transmitted from the wireless power receiver to the wireless power transmitter may further include at least one of information indicating that an external power source is connected to the wireless power receiver by wire and information indicating that the out-of-band communication scheme has changed (e.g., the communication scheme may change from NFC (Near Field Communication) to BLE (Bluetooth Low Energy) communication).

According to another embodiment of the present disclosure, a wireless power transmitter may adaptively determine the intensity of power to be receiver by each wireless power receiver based on at least one of the currently available power of the power transmitter, the priority of each wireless power receiver, and the number of connected wireless power receivers. Here, the power intensity of each wireless power receiver may be determined as a proportion of power to be received with respect to the maximum power that may be processed by the rectifier of the corresponding wireless power receiver.

Thereafter, the wireless power transmitter may transmit, to the wireless power receiver, a predetermined power control command including information about the determined power intensity. Then, the wireless power receiver may determine whether power control can be performed based on the power intensity determined by the wireless power transmitter, and transmit the determination result to the wireless power transmitter through a predetermined power control response message.

According to another embodiment of the present disclosure, a wireless power receiver may transmit predetermined receiver state information indicating whether wireless power control can be performed according to a power control command of a wireless power transmitter before receiving the power control command.

The power transfer state 540 may be any one of a first state 541, a second state 542 and a third state 543 depending on the power reception state of the connected wireless power receiver.

In one example, the first state 541 may indicate that the power reception state of all wireless power receivers connected to the wireless power transmitter is a normal voltage state.

The second state 542 may indicate that the power reception state of at least one wireless power receiver connected to the wireless power transmitter is a low voltage state and there is no wireless power receiver which is in a high voltage state.

The third state 543 may indicate that the power reception state of at least one wireless power receiver connected to the wireless power transmitter is a high voltage state.

When a system error is sensed in the power save state 520, the low power state 530, or the power transfer state 540, the wireless power transmitter may transition to the latching fault state 560.

The wireless power transmitter in the latching fault state 560 may transition to either the configuration state 510 or the power save state 520 when it is determined that all connected wireless power receivers have been removed from the charging area.

In addition, when a local fault is sensed in the latching fault state 560, the wireless power transmitter may transition to the local fault state 550. Here, the wireless power transmitter in the local fault state 550 may transition back to the latching fault state 560 when the local fault is released.

On the other hand, in the case where the wireless power transmitter transitions from any one state among the configuration state 510, the power save state 520, the low power state 530, and the power transfer state 540 to the local fault state 550, the wireless power transmitter may transition to the configuration state 510 once the local fault is released.

The wireless power transmitter may interrupt the power supplied to the wireless power transmitter once it transitions to the local fault state 550. For example, the wireless power transmitter may transition to the local fault state 550 when a fault such as overvoltage, overcurrent, or overheating is sensed. However, embodiments are not limited thereto.

In one example, the wireless power transmitter may transmit, to at least one connected wireless power receiver, a predetermined power control command for reducing the intensity of power received by the wireless power receiver when overcurrent, overvoltage, or overheating is sensed.

In another example, the wireless power transmitter may transmit, to at least one connected wireless power receiver, a predetermined control command for stopping charging of the wireless power receiver when overcurrent, overvoltage, or overheating is sensed.

Through the above-described power control procedure, the wireless power transmitter may prevent damage to the device due to overvoltage, overcurrent, overheating, or the like.

If the intensity of the output current of the transmission resonator is greater than or equal to a reference value, the wireless power transmitter may transition to the latching fault state 560. The wireless power transmitter that has transitioned to the latching fault state 560 may attempt to make the intensity of the output current of the transmission resonator less than or equal to a reference value for a predetermined time. Here, the attempt may be repeated a predetermined number of times. If the latching fault state 560 is not released despite repeated execution, the wireless power transmitter may send, to the user, a predetermined notification signal indicating that the latching fault state 560 is not released, using a predetermined notification means. In this case, when all of the wireless power receivers positioned in the charging area of the wireless power transmitter are removed from the charging area by the user, the latching fault state 560 may be released.

On the other hand, if the intensity of the output current of the transmission resonator falls below the reference value within a predetermined time, or if the intensity of the output current of the transmission resonator falls below the reference value during the predetermined repetition, the latching fault state 560 may be automatically released. In this case, the wireless power transmitter may automatically transition from the latching fault state 560 to the power save state 520 to perform the sensing and identification procedure for a wireless power receiver again.

The wireless power transmitter in the power transfer state 540 may transmit continuous power and adaptively control the transmit power based on the state information on the wireless power receiver and predefined optimal voltage region setting parameters.

For example, the predefined optimal voltage region setting parameters may include at least one of a parameter for identifying a low voltage region, a parameter for identifying an optimum voltage region, a parameter for identifying a high voltage region, and a parameter for identifying an overvoltage region.

The wireless power transmitter may increase the transmit power if the power reception state of the wireless power receiver is in the low voltage region, and reduce the transmit power if the power reception state is in the high voltage region.

The wireless power transmitter may also control the transmit power to maximize the power transmission efficiency.

The wireless power transmitter may also control the transmit power such that the deviation of power required by the wireless power receiver is less than or equal to a reference value.

In addition, the wireless power transmitter may stop transmitting power when the output voltage of the rectifier of the wireless power receiver reaches a predetermined overvoltage region-namely, when overvoltage is sensed.

Figure 6:
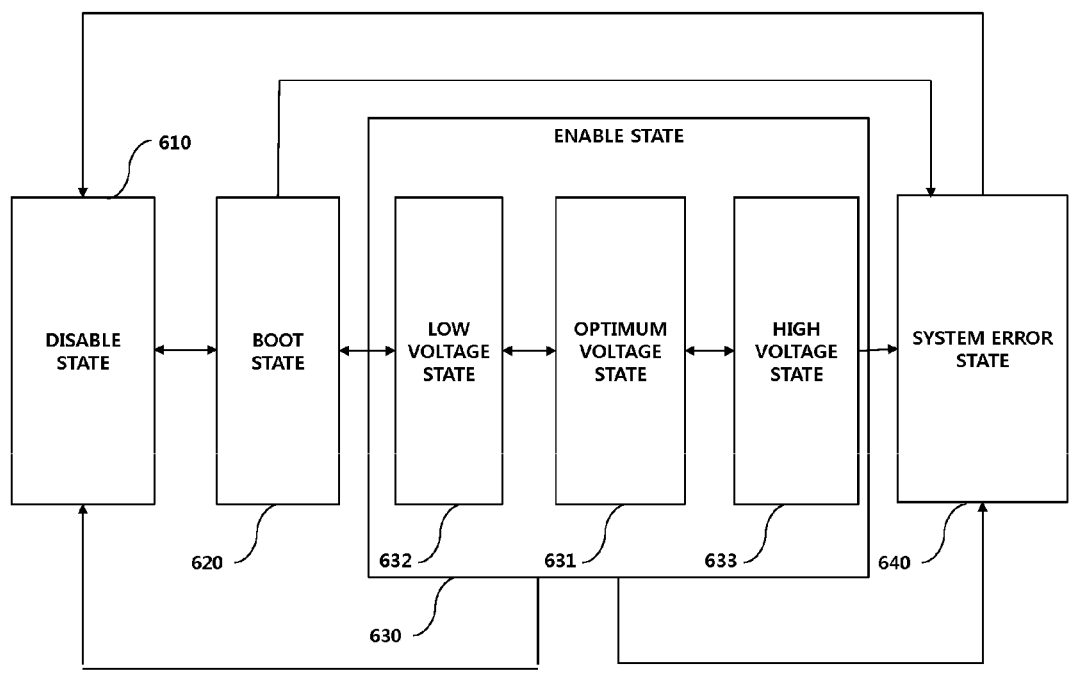
FIG. 6 is a state transition diagram illustrating a state transition procedure of a wireless power receiver in an electromagnetic resonance scheme according to an embodiment of the present disclosure.

FIG. 6 is a state transition diagram illustrating a state transition procedure of a wireless power receiver in an electromagnetic resonance scheme according to an embodiment of the present disclosure.

Referring to FIG. 6, the states of the wireless power receiver may include a disable state 610, a boot state 620, an enable state (or on state) 630 and a system error state 640.

The state of the wireless power receiver may be determined based on the intensity of the output voltage at the rectifier end of the wireless power receiver (hereinafter, referred to as $V_{RECT}$ for simplicity).

The enable state 630 may be divided into an optimum voltage 631, a low voltage state 632 and a high voltage state 633 according to the value of $V_{RECT}$.

The wireless power receiver in the disable state 610 may transition to the boot state 620 if the measured value of $V_{RECT}$ is greater than or equal to the predefined value of $V_{RECT\_BOOT}$.

In the boot state 620, the wireless power receiver may establish an out-of-band communication link with a wireless power transmitter and wait until the value of $V_{RECT}$ reaches the power required at the load stage.

When it is sensed that the value of $V_{RECT}$ has reached the power required at the load stage, the wireless power receiver in the boot state 620 may transition to the enable state 630 and begin charging.

The wireless power receiver in the enable state 630 may transition to the boot state 620 when it is sensed that charging is completed or interrupted.

In addition, the wireless power receiver in the enable state 630 may transition to the system error state 640 when a predetermined system error is sensed. Here, the system error may include overvoltage, overcurrent, and overheating, as well as other predefined system error conditions.

In addition, the wireless power receiver in the enable state 630 may transition to the disable state 610 if the value of $V_{RECT}$ falls below the value of $V_{RECT\_BOOT}$.

In addition, the wireless power receiver in the boot state 620 or the system error state 640 may transition to the disable state 610 if the value of $V_{RECT}$ falls below the value of $V_{RECT\_BOOT}$.

Hereinafter, state transition of the wireless power receiver in the enable state 630 will be described in detail with reference to FIG. 7.

Figure 7:
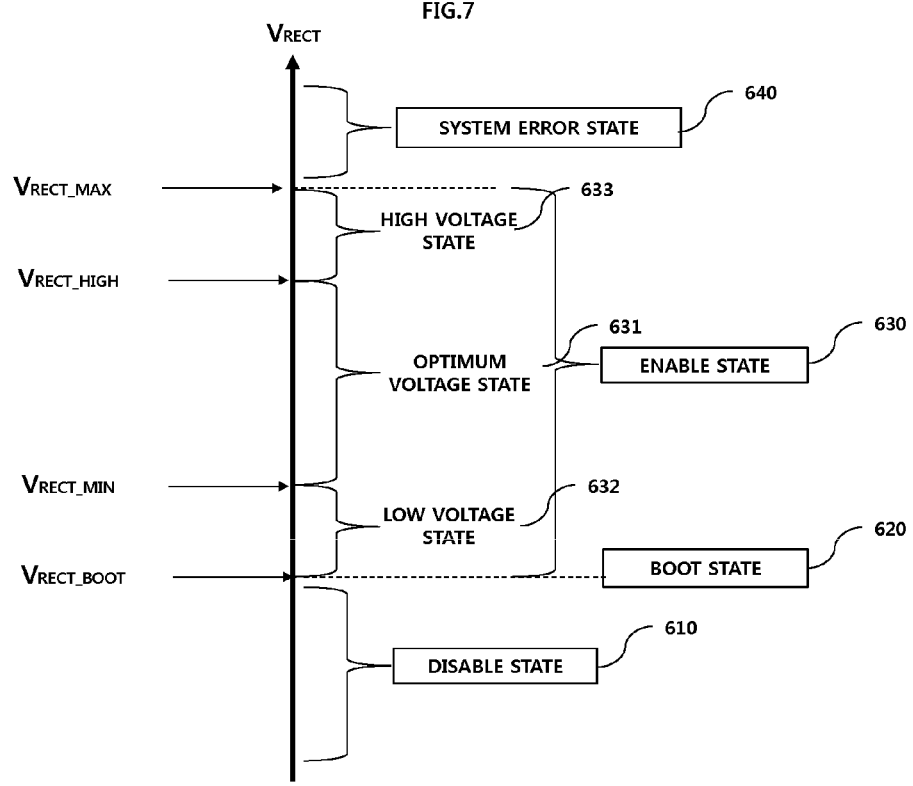
FIG. 7 illustrates operation regions of a wireless power receiver according to $V_{RECT}$ in an electromagnetic resonance scheme according to an embodiment of the present disclosure.

FIG. 7 illustrates operation regions of a wireless power receiver according to $V_{RECT}$ in an electromagnetic resonance scheme according to an embodiment of the present disclosure.

Referring to FIG. 7, if the value of $V_{RECT}$ is less than a predetermined value of $V_{RECT\_BOOT}$, the wireless power receiver is maintained in the disable state 610.

Thereafter, when the value of $V_{RECT}$ is increased beyond $V_{RECT\_BOOT}$, the wireless power receiver may transition to the boot state 620 and broadcast an advertisement signal within a predetermined time. Thereafter, when the advertisement signal is sensed by the wireless power transmitter, the wireless power transmitter may transmit a predetermined connection request signal for establishing an out-of-band communication link to the wireless power receiver.

Once the out-of-band communication link is normally established and successfully registered, the wireless power receiver may wait until the value of $V_{RECT}$ reaches the minimum output voltage of the rectifier for normal charging (hereinafter, referred to as $V_{RECT\_MIN}$ for simplicity).

If the value of $V_{RECT}$ exceeds $V_{RECT\_MIN}$, the wireless power receiver may transition from the boot state 620 to the enable state 630 and may begin charging the load.

If the value of $V_{RECT}$ in the enable state 630 exceeds a predetermined reference value $V_{RECT\_MAX}$ for determining overvoltage, the wireless power receiver may transition from the enable state 630 to the system error state 640.

Referring to FIG. 7, the enable state 630 may be divided into the low voltage state 632, the optimum voltage 631 and the high voltage state 633 according to the value of $V_{RECT}$.

The low voltage state 632 may refer to a state in which $V_{RECT\_BOOT} \leq V_{RECT} \leq V_{RECT\_MIN}$, the optimum voltage state 631 may refer to a state in which $V_{RECT\_MIN} < V_{RECT} \leq V_{RECT\_HIGH}$, and the high voltage state 633 may refer to a state in which $V_{RECT\_HIGH} < V_{RECT} \leq V_{RECT\_MAX}$.

In particular, the wireless power receiver having transitioned to the high voltage state 633 may suspend the operation of cutting off the power supplied to the load for a predetermined time (hereinafter, referred to as a high voltage state maintenance time for simplicity). The high voltage state maintenance time may be predetermined so as not to cause damages to the wireless power receiver and the load in the high voltage state 633.

When the wireless power receiver transitions to the system error state 640, it may transmit a predetermined message indicating occurrence of overvoltage to the wireless power transmitter through the out-of-band communication link within a predetermined time.

The wireless power receiver may also control the voltage applied to the load using an overvoltage interruption means provided to prevent damage to the load due to the overvoltage in the system fault state 630. Here, an ON/OFF switch and/or a Zener diode may be used as the overvoltage interruption means.

Although a method and means for coping with a system error in a wireless power receiver when overvoltage is generated and the wireless power receiver transitions to the system error state 640 have been described in the above embodiment, this is merely an embodiment. In other embodiments, the wireless power receiver may transition to the system error state due to overheating, overcurrent, and the like.

As an example, in the case where the wireless power receiver transitions to the system error state due to overheating, the wireless power receiver may transmit a predetermined message indicating the occurrence of overheating to the wireless power transmitter. In this case, the wireless power receiver may drive a cooling fan or the like to reduce the internally generated heat.

According to another embodiment of the present disclosure, a wireless power receiver may receive wireless power in conjunction with a plurality of wireless power transmitters. In this case, the wireless power receiver may transition to the system error state 640 if it is determined that the wireless power transmitter form which the wireless power receiver is determined to actually receive wireless power is different from the wireless power transmitter with which the out-of-band communication link is actually established.

Figure 8:
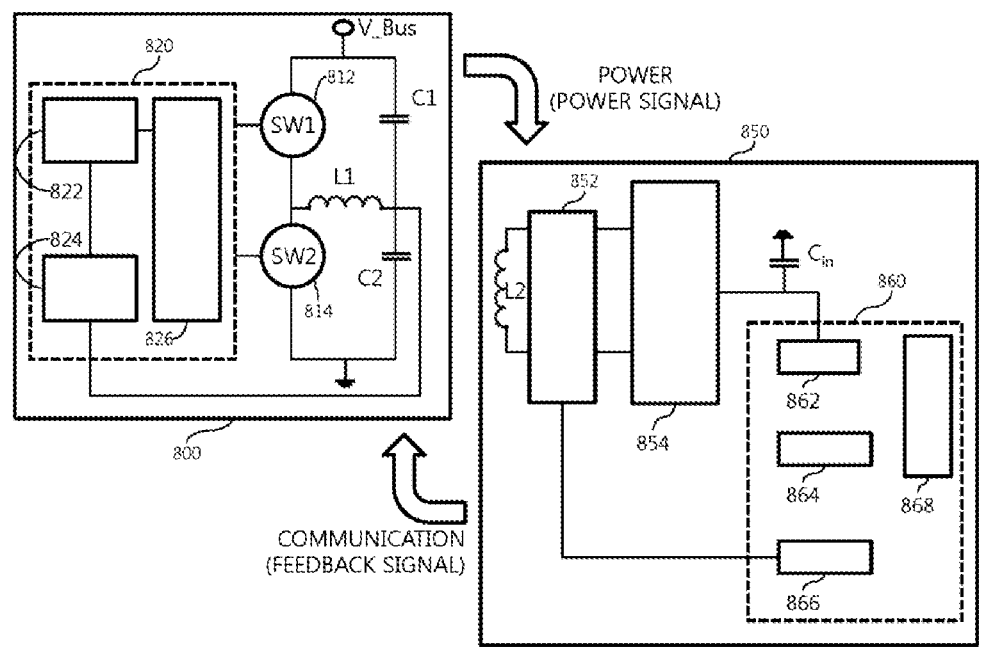
FIG. 8 is a diagram illustrating a wireless charging system of an electromagnetic induction scheme according to an embodiment of the present disclosure.

FIG. 8 is a diagram illustrating a wireless charging system of an electromagnetic induction scheme according to an embodiment of the present disclosure.

Referring to FIG. 8, a wireless charging system according to the electromagnetic induction scheme includes a wireless power transmitter 800 and a wireless power receiver 850. By placing an electronic device including the wireless power receiver 850 on the wireless power transmitter 800, the coils of the wireless power transmitter 800 and the wireless power receiver 850 may be coupled by an electromagnetic field.

The wireless power transmitter 800 may modulate a power signal and change the frequency to create an electromagnetic field for power transmission. The wireless power receiver 850 may receive power by demodulating the electromagnetic signal according to the protocol set to be suitable for the wireless communication environment and transmit a predetermined feedback signal to the wireless power transmitter 100 via in-band communication based on the intensity of the received power to control the intensity of the transmit power of the wireless power transmitter 800. For example, the wireless power transmitter 800 may control the operating frequency according to a control signal for power control to increase or decrease the transmit power.

The power (or increase/decrease of the power) to be transmitted may be controlled using a feedback signal transmitted from the wireless power receiver 850 to the wireless power transmitter 800. Communication between the wireless power receiver 850 and the wireless power transmitter 800 is not limited to in-band communication using the feedback signal described above, but may also be performed using out-of-band communication provided with a separate communication module. For example, short-range wireless communication modules such as a Bluetooth module, a Bluetooth Low Energy (BLE) module, an NFC module, and a ZigBee module may be used.

In the electromagnetic induction scheme, a frequency modulation scheme may be used as a protocol for exchanging state information and control signals between the wireless power transmitter 800 and the wireless power receiver 850. The device identification information, the charging state information, the power control signal, and the like may be exchanged through the protocol.

As shown in FIG. 8, the wireless power transmitter 800 according to an embodiment of the present disclosure includes a signal generator 820 for generating a power signal, a coil L1 and capacitors C1 and C2 positioned between the power supply terminals V_Bus and GND capable of sensing a feedback signal transmitted from the wireless power receiver 850, and switches SW1 and SW2 whose operation is controlled by the signal generator 820. The signal generator 820 may include a demodulator 824 for demodulating a feedback signal transmitted through the coil L1, a frequency driver 826 for changing the frequency, and a transmission controller 822 for controlling the modulator 824 and the frequency driver 826. The feedback signal transmitted through the coil L1 may be demodulated by the demodulation unit 824 and then input to the transmission controller 822. The transmission controller 822 may control the frequency driver 826 based on the demodulated signal to change the frequency of the power signal transmitted through the coil L1.

The wireless power receiver 850 may include a modulator 852 for transmitting a feedback signal through a coil L2, a rectifier 854 for converting an AC signal received through the coil L2 into a DC signal, and a reception controller 860 for controlling the modulator 852 and the rectifier 854. The reception controller 860 may include a power supplier 862 for supplying power necessary for operation of the rectifier 854 and the wireless power receiver 850, and a DC-DC converter 864 for changing the DC output voltage of the rectifier 854 to a DC voltage satisfying the charging condition an charging target (a load 868), a load 868 for outputting the converted power, and a feedback communication unit 866 for generating a feedback signal for providing a receive power state and a charging target state to the wireless power transmitter 800.

The operation state of the wireless charging system supporting the electromagnetic induction scheme may be broadly classified into a standby state, a signal detection state, an identification confirmation state, a power transfer state, and an end-of-charge state. Transition to a different operation state may be performed according to a result of feedback communication between the wireless power receiver 850 and the wireless power transmitter 800. Transition between the standby state and the signal detection state may be performed using a predetermined receiver detection method for detecting presence of the wireless power receiver 800.

Figure 9:
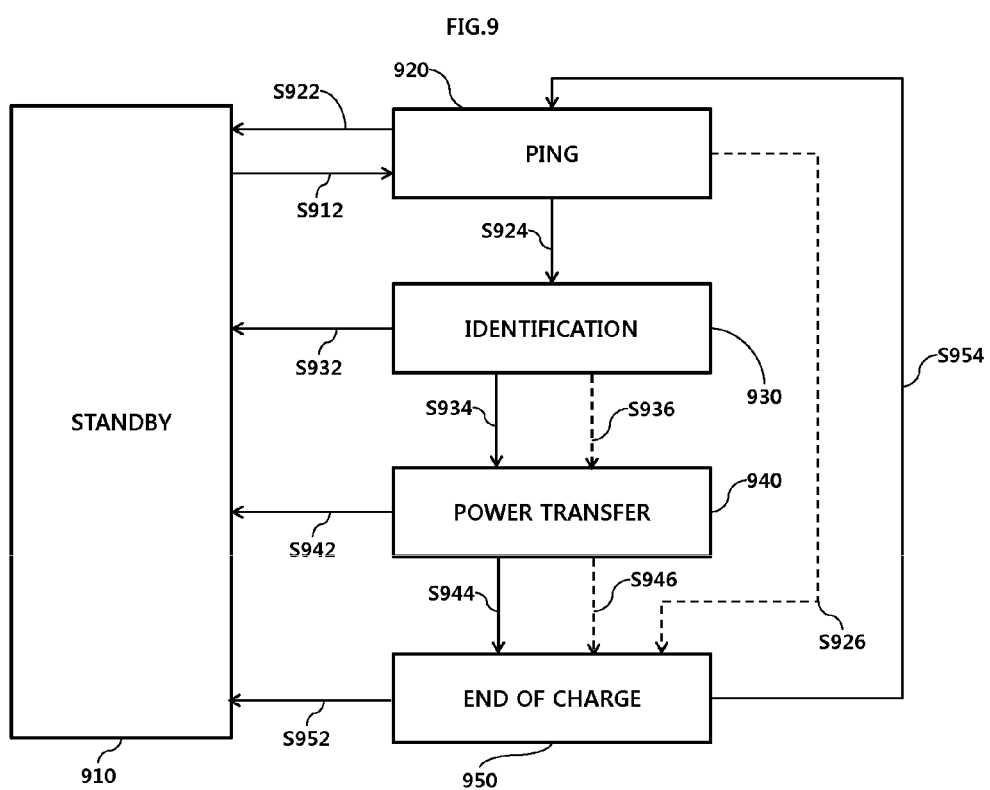
FIG. 9 is a state transition diagram of a wireless power transmitter supporting an electromagnetic induction scheme according to an embodiment of the present disclosure.

FIG. 9 is a state transition diagram of a wireless power transmitter supporting an electromagnetic induction scheme according to an embodiment of the present disclosure.

As shown in FIG. 9, the operation states of the wireless power transmitter may be broadly divided into a standby state (STANDBY) 910, a signal detection state (PING) 920, an identification confirmation state (IDENTIFICATION) 930, a power transfer state (POWER TRANSFER) 940 and an end-of-charge state (END OF CHARGE) 950.

Referring to FIG. 9, during the standby state 910, the wireless power transmitter monitors the charging area to sense if a chargeable reception device is positioned in the charging area. The wireless power transmitter may monitor change in magnetic field, capacitance, or inductance to sense a chargeable reception device. When a chargeable reception device is found, the wireless power transmitter may transition from the standby state 910 to the signal detection state 920 (S912).

In the signal detection state 920, the wireless power transmitter may connect to the chargeable reception device and check if the reception device is using a valid wireless charging technique. In addition, in the signal detection state 220, the wireless power transmitter may perform an operation to distinguish other devices that generate dark current (parasitic current).

In the signal detection state 920, the wireless power transmitter may also send a digital ping having a structure according to a predetermined frequency and time to connect to a chargeable reception device. If a sufficient power signal is transferred from the wireless power transmitter to the wireless power receiver, the wireless power receiver may respond by modulating the power signal according to the protocol set in the electromagnetic induction scheme. If a valid signal according to the wireless charging technique used by the wireless power transmitter is received, the wireless power transmitter may transition from the signal detection state 920 to the identification confirmation state 930 without interrupting transmission of the power signal (S924). A wireless power transmitter that does not support the operation in the identification confirmation state 930 may transition to the power transfer state 940 (S924 and S934).

If the wireless power transmitter receives an end-of-charge signal from the wireless power receiver, the wireless power transmitter may transition from the signal detection power state 920 to the end-of-charge state 950 (S926).

If no response from the wireless power receiver is sensed in the signal detection state 920, for example, if no feedback signal is received for a predetermined time, the wireless power transmitter may interrupt transmission of the power signal and transition to the standby state 910 (S922).

The identification confirmation state 930 may be selectively included depending on the wireless power transmitter.

Unique receiver identification information may be pre-allocated and maintained for each wireless power receiver. When a digital ping is sensed, the wireless power receiver needs to inform the wireless power transmitter that the corresponding device is chargeable according to a specific wireless charging technique. To check such receiver identification information, the wireless power receiver may transmit its unique identification information to the wireless power transmitter through feedback communication.

A wireless power transmitter supporting the identification confirmation state 930 may determine validity of the receiver identification information sent from the wireless power receiver. If it is determined that the received receiver identification information is valid, the wireless power transmitter may transition to the power transfer state 940 (S936). If the received receiver identification information is not valid or validity is not determined within a predetermined time, the wireless power transmitter may interrupt transmission of the power signal and transition to the standby state 910 (S932).

In the power transfer state 940, the wireless power transmitter may control the intensity of the transmit power based on the feedback signal received from the wireless power receiver. In addition, the wireless power transmitter in the power transfer state 940 may verify that there is no violation of an acceptable operation region and tolerance limit that may arise, for example, by detection of a new device.

If a predetermined end-of-charge signal is received from the wireless power receiver in the power transfer state 940, the wireless power transmitter may stop transmitting the power signal and transition to the end-of-charge state 950 (S946). In addition, if the internal temperature exceeds a predetermined value during operation in the power transfer state 940, the wireless power transmitter may interrupt transmission of the power signal and may transition to the end-of-charge state 950 (S944).

In addition, if a system error or the like is sensed in the power transfer state 940, the wireless power transmitter may stop transmitting the power signal and transition to the standby state 910 (S942). A new charging procedure may be resumed when a reception device to be charged is sensed in the charging area of the wireless power transmitter.

As described above, the wireless power transmitter may transition to the end-of-charge state 950 when the end-of-charge signal is input from the wireless power receiver or the temperature exceeds a predetermined range during operation.

If transition to the end-of-charge state 950 is caused by an end-of-charge signal, the wireless power transmitter may interrupt transmission of the power signal and wait for a certain time. Here, the certain time may vary depending on components such as coils provided in the wireless power transmitter, the range of the charging area, the allowable limit of the charging operation, or the like, in order to transmit the power signal in the electromagnetic induction scheme. After a certain time elapses in the end-of-charge state 950, the wireless power transmitter may transition to the signal detection state 920 to connect to the wireless power receiver positioned on the charging surface (S954). The wireless power transmitter may also monitor the charging surface for a certain time to recognize whether the wireless power reception device is removed. If it is sensed that the wireless power reception device has been removed from the charging surface, the wireless power transmission device may transition to the standby state 910 (S952).

If transition to the end-of-charge state (S950) is performed due to the internal temperature of the wireless power transmitter, the wireless power transmitter may interrupt power transmission and monitor change in internal temperature. If the internal temperature falls within a certain range or to a certain value, the wireless power transmitter may transition to the signal detection state 920 (S954). The temperature range or value for transitioning the state of the wireless power transmitter may vary depending on the technology and method for manufacturing the wireless power transmitter. While monitoring change in temperature, the wireless power transmitter may monitor the charging surface to recognize if the wireless power reception device is removed. If it is sensed that the wireless power reception device has been removed from the charging surface, the wireless power transmitter may transition to the standby state 910 (S952).

Figure 10:
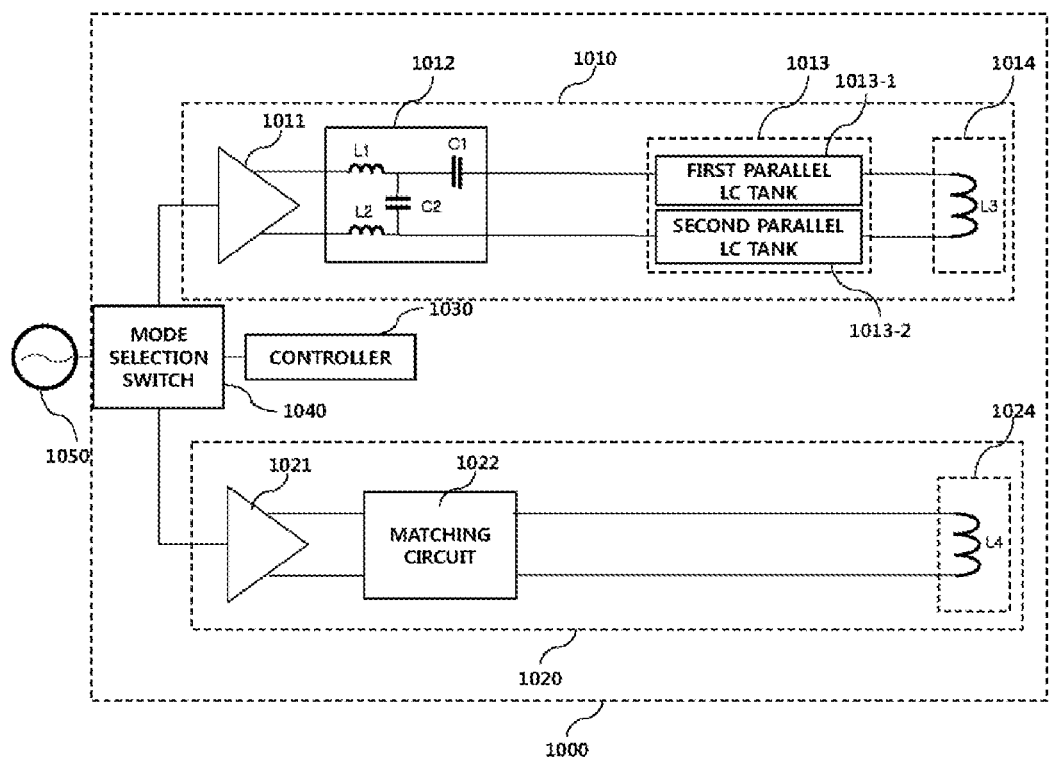
FIG. 10 is a block diagram illustrating a structure of a wireless power transmitter supporting multiple modes according to an embodiment of the present disclosure.

FIG. 10 is a block diagram illustrating a structure of a wireless power transmitter supporting multiple modes according to an embodiment of the present disclosure.

Referring to FIG. 10, the wireless power transmitter 1000 may include an inductive transmitter 1010, a resonant transmitter 1020, a controller 1030, and a mode selection switch 1040. However, embodiments are not limited thereto.

The mode selection switch 1040 may be connected to a power source 1050 and may perform a switching function such that the power applied from the power source 1050 is transmitted to the inductive transmitter 1010 or the resonant transmitter 1020 under control of the controller 1030.

In another embodiment of the present disclosure, the power source 1050 may be supplied through an external power terminal or may be a battery that is mounted inside the wireless power transmitter 1000.

The inductive transmitter 1010 may include an inductive inverter 1011, a resonant circuit 1012, a resonant power interruption circuit 1013, and a transmission induction coil (L3) 1014. A magnet may be further included for alignment between the reception induction coils mounted on the receiver of the transmission induction coil 1014 depending on the design of the inductive transmitter 1010 according to an embodiment of the present disclosure.

The inductive inverter 1011 may convert a direct current (DC) waveform applied through the mode selection switch 1040 into an alternating current (AC) waveform for driving the resonant circuit 1012. In the inductive inverter 1011, a predetermined operating frequency range and/or duty cycle of a power signal for controlling the transmit power may be defined. That is, the transmit power may be dynamically controlled by changing the operating frequency. The inductive inverter 1011 according to an embodiment of the present disclosure may be designed as a half-bridge inverter or a full-bridge inverter according to the class and use of the wireless power transmitter.

The resonant circuit 1012 may be configured with a combination of a series of inductors and capacitors and be used to resonate the AC waveform received from the inductive inverter 1011. For example, referring to FIG. 10, the resonant circuit 1012 may be composed of two inductors L1 and L2 and two capacitors C1 and C2. However, embodiments are not limited thereto.

The resonant power interruption circuit 1013 may function to interrupt transmission of the power signal transmitted through the resonant transmitter 1020 such that the power signal may not be coupled with the transmission induction coil 1014 to be transmitted to the resonant circuit 1012 and the inductive inverter 1011, thereby functioning to prevent power loss. That is, the resonant power interruption circuit 1013 may interrupt the power signal output by the resonant transmitter 1020 and pass the power signal output by the inductive transmitter 1010. For example, the resonant power interruption circuit 1013 may be implemented through first and second parallel LC tanks 1013-1 and 1013-2 configured by connecting an inductor and a capacitor in parallel, but embodiments are not limited thereto. The resonant power interruption circuit 1013 according to another embodiment of the present disclosure may be a switch implemented to close or open a line.

The resonant transmitter 1020 may include a resonant inverter 1021, a matching circuit 1022, and a transmission resonant coil (L4) 1024. Here, the resonant inverter 1021 and the matching circuit 1022 may correspond to the power conversion unit 120 and the matching circuit 130 of FIG. 1, respectively, and the description of FIG. 1 is applied thereto.

The controller 1030 may control the overall operation of the wireless power transmitter 1000. In particular, the controller 1030 may adaptively determine a wireless power transmission mode based on the characteristics and state of the wireless power receiver, and control the mode selection switch 1040 according to the determined wireless power transmission mode. For example, when the wireless power transmission mode which can be supported by the wireless power receiver connected to the wireless power transmitter 1000 is identified as the electromagnetic resonance mode, the controller 1030 may control the mode selection switch 1040 such that the power 1050 is supplied to the resonant transmitter 1020. In another example, when the wireless power transmission mode which can be supported by the wireless power receiver connected to the wireless power transmitter 1000 is identified as the electromagnetic induction mode, the controller 1030 may control the mode selection switch 1040 such that the power 1050 may be supplied to the inductive transmitter 1010.

In addition, the controller 1030 may control the inductive inverter 1011 and the resonant inverter 1021 to control the intensity of the power signal transmitted through the coil.

The controller 1030 may also control the operation of the resonant power interruption circuit 1013 according to the determined wireless power transmission mode. For example, if the resonant power interruption circuit 1013 is a parallel LC circuit and the parallel LC circuit is composed of a variable inductor and/or a variable capacitor, the controller may control the inductance value and the capacitance value to dynamically control a frequency band to be interrupted or a frequency band to be passed.

Figure 11:
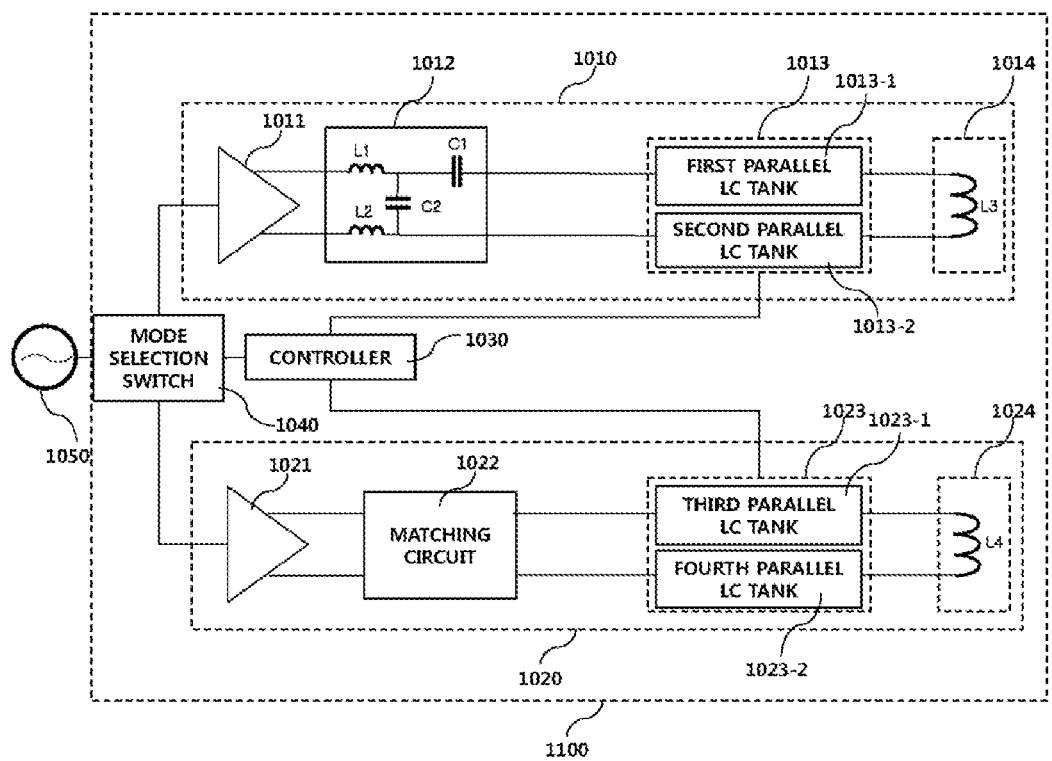
FIG. 11 is a block diagram illustrating the structure of a wireless power transmitter supporting multiple modes according to another embodiment of the present disclosure.

FIG. 11 is a block diagram illustrating the structure of a wireless power transmitter supporting multiple modes according to another embodiment of the present disclosure.

Referring to FIG. 11, a wireless power transmitter 1100 according to another embodiment of the present disclosure may further include an inductive power interruption circuit 1023.

The inductive power interruption circuit 1023 may block the power signal transmitted through the inductive transmitter 1010 from being coupled with the resonant transmitter 1020 and delivered to the matching circuit 1022 and the resonant inverter 1021. That is, the inductive power interruption circuit 1023 may interrupt the power signal output by the inductive transmitter 1010 and pass the power signal output by the resonant transmitter 1020. To this end, the inductive power interruption circuit 1023 according to an embodiment of the present disclosure may be implemented through third and fourth parallel LC TANKs 1023-1 and 1023-2 configured by connecting an inductor and a capacitor in parallel. However, embodiments are not limited thereto. According to another embodiment of the present disclosure, the inductive power interruption circuit 1023 may be a switch implemented to close or open the line.

The controller 1030 may control the operation of the inductive power interruption circuit 1023 according to the determined wireless power transmission mode. For example, if the inductive power interruption circuit 1023 is a parallel LC circuit and the parallel LC circuit is composed of a variable inductor and/or a variable capacitor, the controller 1030 may control the inductance value and/or the capacitance value to dynamically control a frequency band to be interrupted or a frequency band to be passed.

Figure 12:
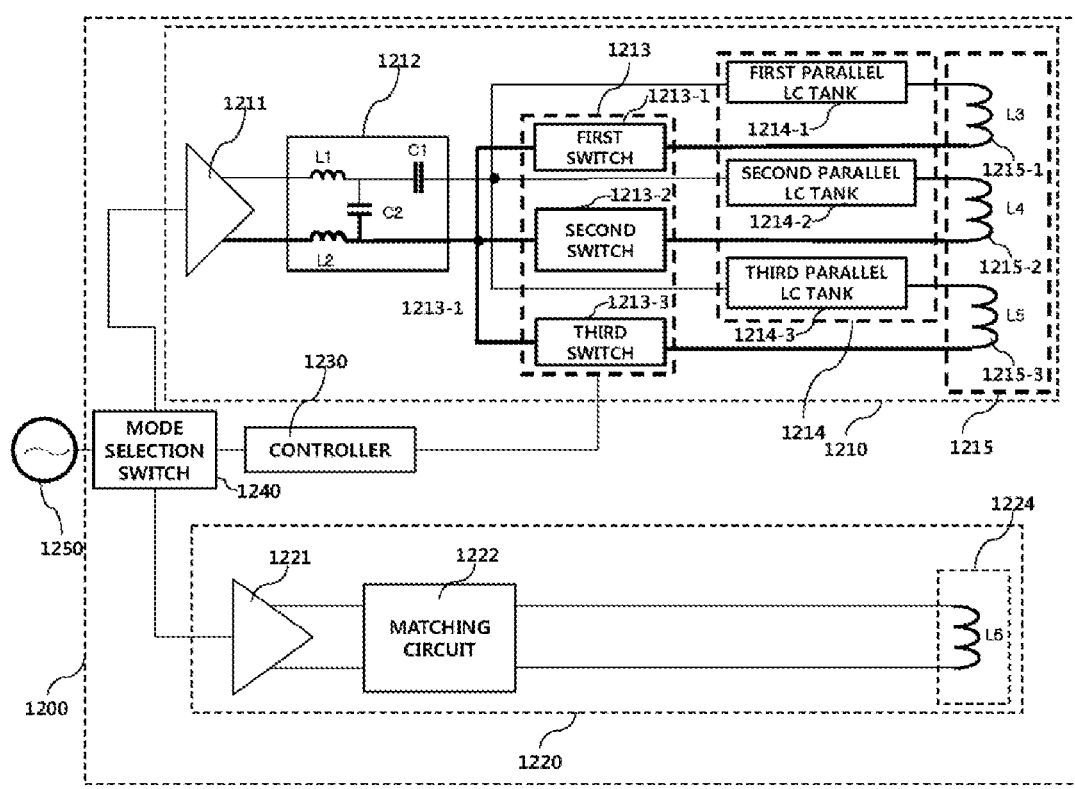
FIG. 12 is a block diagram illustrating the structure of a wireless power transmitter supporting multiple modes according to an embodiment of the present disclosure.

FIG. 12 is a block diagram illustrating the structure of a wireless power transmitter supporting multiple modes according to an embodiment of the present disclosure.

Referring to FIG. 12, the wireless power transmitter 1200 may include an inductive transmitter 1210, a resonant transmitter 1220, a controller 1230, and a mode selection switch 1240. However, embodiments are not limited thereto.

The mode selection switch 1240 may be connected to a power source 1250 and may perform a switching function such that the power supplied from the power source 1250 is transmitted to the inductive transmitter 1210 or the resonant transmitter 1220 under control of the controller 1230.

In another embodiment of the present disclosure, the power source 1250 may be supplied through an external power terminal or may be a battery that is mounted inside the wireless power transmitter 1200.

The inductive transmitter 1210 may include an inductive inverter 1211, a resonant circuit 1212, a transmission induction coil selection circuit 1213, a resonant power interruption circuit 1214 and a transmission induction coil 1215. Here, the transmission induction coil 1215 may include a plurality of coils. While it is illustrated in FIG. 12 that the transmission induction coil 1215 has three coils L3 (1215-

1)/L4 (1215-2)/L5 (1215-3), but this is merely an embodiment. It should be noted that a transmission induction coil according to another embodiment of the present disclosure may include more or fewer coils depending on the implementation and use of the wireless power transmitter 1200.

The inductive inverter 1211 may convert a direct current (DC) waveform applied through the mode selection switch 1240 into an alternating current (AC) waveform for driving the resonant circuit 1212. In the inductive inverter 1211, a predetermined operating frequency range and/or duty cycle of a power signal for controlling the transmit power may be defined. In one example, the controller 1230 may dynamically control the transmit power by changing the operating frequency. In another example, the controller 1230 may dynamically control the transmit power by changing the duty cycle of the power signal. In still another example, the controller 1230 may dynamically control the transmit power by simultaneously changing the operating frequency and the duty cycle of the power signal. The inductive inverter 1211 according to an embodiment of the present disclosure may be designed as a half-bridge inverter or a full-bridge inverter according to the class and use of the wireless power transmitter, but embodiments are not limited thereto.

The resonant circuit 1212 may be configured with a combination of a series of inductors and capacitors and be used to resonate the AC waveform received from the inductive inverter 1211. For example, referring to FIG. 12, the resonant circuit 1012 may be composed of two inductors L1 and L2 and two capacitors C1 and C2. However, embodiments are not limited thereto.

The transmission induction coil selection circuit 1213 may be composed of the same number of switches as the number of transmission induction coils 1215 mounted on the inductive transmitter 1210. For example, as shown in FIG. 12, when the number of the transmission induction coils 1215 is three, the transmission induction coil selection circuit 1213 may be constituted by first to third switches 1213-1 to 1213-3. Each of the switches constituting the transmission induction coil selection circuit 1213 may function to allow or interrupt transmission of power to the corresponding coil. When the position of a wireless power receiver is sensed in the charging area, the controller 1230 according to an embodiment of the present disclosure may identify a coil corresponding to the sensed position and control the transmission induction coil selection circuit 1213 to transmit the power signal to only the identified coil.

The resonant power interruption circuit 1214 may function to interrupt transmission of the power signal transmitted through the resonant transmitter 1220 such that the power signal may not be coupled with the transmission induction coil 1214 to be transmitted to the resonant circuit 1012 and the inductive inverter 1211, thereby functioning to prevent power loss of the wireless power transmitter 1200. That is, the resonant power interruption circuit 1214 may be designed to interrupt the power signal output by the resonant transmitter 1220 and pass the power signal output by the inductive transmitter 1210. For example, the resonant power interruption circuit 1214 may be implemented through a parallel LC tank by connecting an inductor and a capacitor in parallel, but embodiments are not limited thereto. The resonant power interruption circuit 1214 according to another embodiment of the present disclosure may be implemented as a switch implemented to close or open a line or as a bandpass filter that passes only a power signal of a specific frequency band.

In particular, the resonant power interruption circuit 1214 according to an embodiment of the present disclosure may include a parallel LC tank corresponding to the number of coils constituting the transmission induction coil 1215. For example, as shown in FIG. 12, when the number of coils constituting the transmission induction coil 1215 is three, the resonant power interruption circuit 1214 includes first to third parallel LC tanks 1214-1 to 1214-3. The parallel LC tanks 1214-1, 1214-2, and 1214-3 may be connected to one of the two terminals of each of the coils, and the switches 1213-1, 1213-2, and 1213-3 may be connected to the other one of the two terminals.

The resonant transmitter 1220 may include a resonant inverter 1221, a matching circuit 1222, and a transmission resonant coil (L6) 1224. Here, the resonant inverter 1221, the matching circuit 1222, and the transmission resonant coil 1224 may correspond to the power conversion unit 120, the matching circuit 130, and the transmission resonator 140 of FIG. 1, respectively, and the description of FIG. 1 is applied thereto.

The controller 1230 may control the overall operation of the wireless power transmitter 1200. In particular, the controller 1230 may adaptively determine the wireless power transmission mode based on the characteristics and the state of the wireless power receiver, and control the mode selection switch 1240 according to the determined wireless power transmission mode to only supply power to a transmitter corresponding to the determined wireless power transmission mode. For example, when the wireless power transmission mode supported by the wireless power receiver connected to the wireless power transmitter 1200 is identified as the electromagnetic resonance mode, the controller 1230 may control the mode selection switch 1240 such that the power 1250 is supplied to the resonant transmitter 1220. In another example, when the wireless power transmission mode that can be supported by the wireless power receiver connected to the wireless power transmitter 1000 is identified as the electromagnetic induction mode, the controller 1230 may control the mode selection switch 1240 such that the power 1250 may be supplied to the inductive transmitter 1210.

In addition, the controller 1230 may control the inductive inverter 1211 and the resonant inverter 1221 to control the intensity of the power signal transmitted through the coil.

The controller 1230 may also control the operation of the switch 1213 and the resonant power interruption circuit 1214 based on the determined wireless power transmission mode and the sensed position of the wireless power receiver. Here, in order to sense the position of the wireless power receiver, the wireless power transmitter 1200 may further include a position sensor (not shown). Here, the position sensor may include at least one of a current sensor for sensing change in current flowing through the coil, a voltage sensor for sensing change in voltage applied across the coil, and an impedance sensor for sensing change in impedance at the coil end. For example, when the position sensor is a current sensor, the position sensor may sense that a load (or a wireless power receiver) is present in the coil region if the current flowing in the coil or a change in the current flowing in the coil exceeds a predetermined reference value or a predetermined reference range. The position sensor may transmit, to the controller 1230, information indicating that a load is detected in the corresponding coil region, and the controller 1230 may control the operation of the switch 1213 and the resonant power interruption circuit 1214 according to the load sensing result.

If the resonant power interruption circuit 1214 is a parallel LC circuit and the parallel LC circuit is composed of a variable inductor and/or a variable capacitor, the controller 1230 may control the inductance value and the capacitance value to dynamically control a frequency band to be interrupted or a frequency band to be passed.

Figure 13:
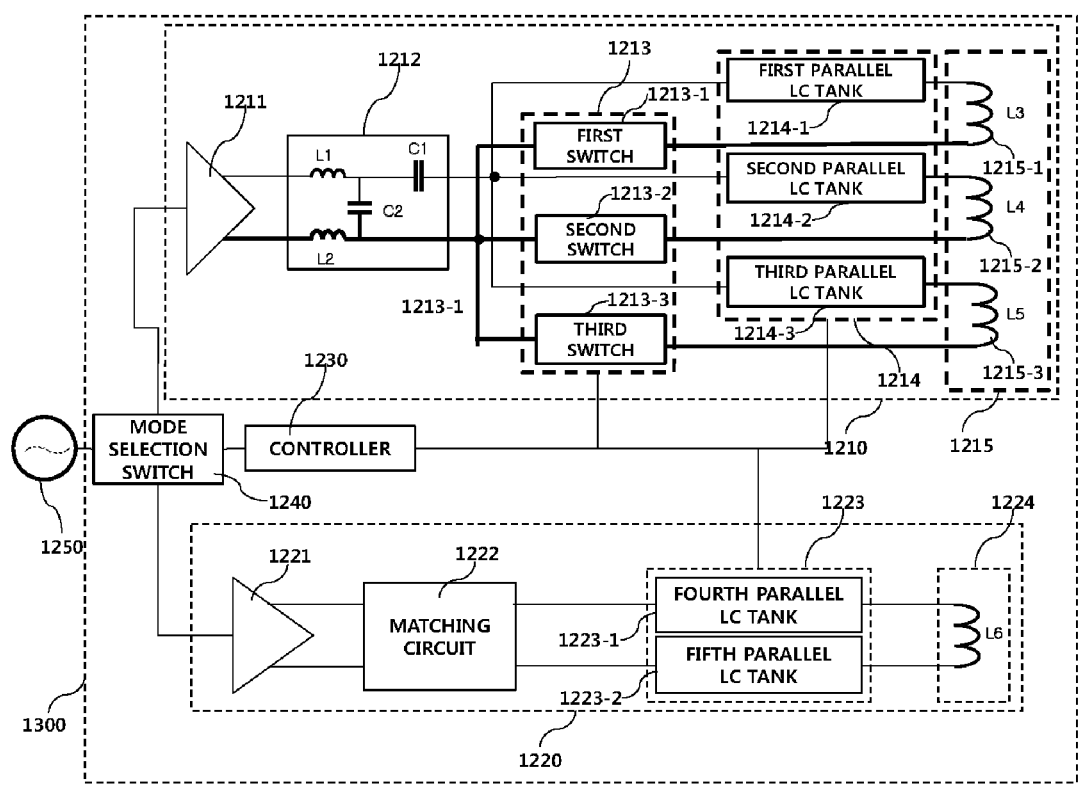
FIG. 13 is a block diagram illustrating the structure of a wireless power transmitter supporting multiple modes according to another embodiment of the present disclosure.

FIG. 13 is a block diagram illustrating the structure of a wireless power transmitter supporting multiple modes according to another embodiment of the present disclosure.

Referring to FIG. 13, a wireless power transmitter 1300 according to an embodiment of the present disclosure may further include an inductive power interruption circuit 1223 in the elements of the wireless power transmitter 1200 of FIG. 12. Here, the inductive power interruption circuit 1223 may be designed to perform a function of passing a power signal of a specific resonant frequency band received from the matching circuit 1222 and transmitting the same to the transmission resonant coil 1224 and a function of interrupting a power signal input through coupling between the electromagnetic signal output by the inductive transmitter 1210 and the transmitting resonant coil 1224.

For example, the inductive power interruption circuit 1223 may include fourth and fifth parallel LC tanks 1223-1 and 1223-2 respectively connected to both ends of the transmission resonant coil 1224, but embodiments are not limited thereto. According to another embodiment of the present disclosure, the inductive power interruption circuit 1223 may include a switch capable of closing or opening a line between the matching circuit 1223 and the transmission resonant coil 1224 or a band-pass filter for filtering and passing only signals of a specific frequency band.

Figure 14:
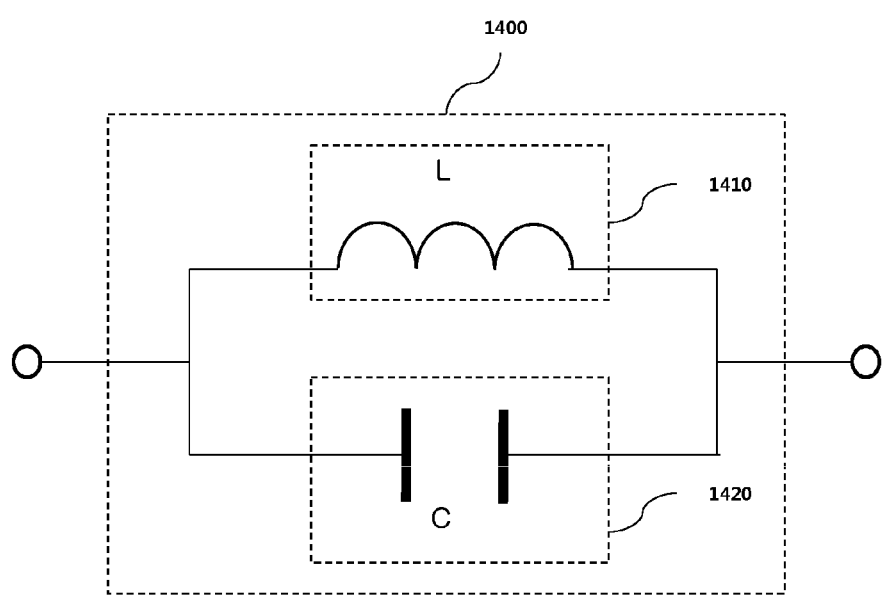
FIG. 14 is an equivalent circuit diagram of a parallel LC tank according to an embodiment of the present disclosure.

FIG. 14 is an equivalent circuit diagram of a parallel LC tank according to an embodiment of the present disclosure.

Referring to FIG. 14, the parallel LC tank 1400 may have a structure in which an inductor 1410 and a capacitor 1420 are connected in parallel.

When the inductance value of the parallel LC tank 1400 is L (unit: Henry (H)) and the capacitance value thereof is C (unit: Farad (F)), the frequency $f_0$ passed through the parallel LC tank 1400 (Unit: hertz (Hz)) may be calculated by Equation 1.

$$f_0 = \frac{1}{2\pi\sqrt{LC}} \quad \text{Equation 1}$$

Thus, when the operating frequency band used by the inductive transmitter differs from the operating frequency band used by the resonant transmitter, the parallel LC tank 1400 may be configured to allocate an L value and/or a C value to allow only power signals of a specific operating frequency band to be bypassed.

For example, in the case of a parallel LC tank for preventing a power signal output according to the electromagnetic resonance scheme with the operating frequency band of 6.78 MHz from being input by being coupled to the transmission coil for supporting the electromagnetic induction scheme having the operating frequency band of 110 to 250 kHz, the inductance value and the capacitance value may be determined such that high Impedance is given to the operating frequency band of the electromagnetic resonance scheme and low impedance is given to the operating frequency band of the electromagnetic induction scheme. That is, the parallel LC TACK in the above-described example may be designed to prevent a power signal of the electromagnetic resonance scheme from being coupled to the induction coil and introduced into the inductive transmitter and to bypass a power signal of the operating frequency band according to the electromagnetic induction scheme.

For example, the inductance value and the capacitance value of the parallel LC tank for the above operation may be determined as 1 µH and 520 µF, respectively. However, embodiments are not limited thereto.

Figure 15:
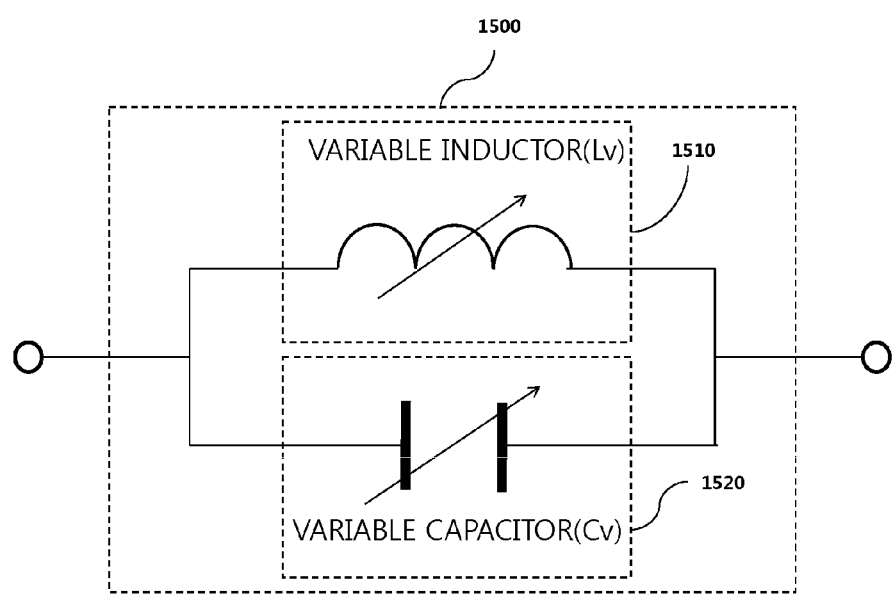
FIG. 15 is an equivalent circuit diagram of a parallel LC tank according to another embodiment of the present disclosure.

FIG. 15 is an equivalent circuit diagram of a parallel LC tank according to another embodiment of the present disclosure.

Referring to FIG. 15, a parallel LC tank 1500 may have a structure in which a variable inductor 1510 and a variable capacitor 1520 are connected in parallel. Here, the inductance value of the variable inductor 1510 and the capacitance value of the variable capacitor 1520 may be set dynamically.

The operating frequency band applied to the inductive transmitter and the resonant transmitter may differ depending on the wireless power transmission standard and implementation applied. In this case, the wireless power transmitter may dynamically control the bypass frequency band of the parallel LC tank 1500 according to the operating frequency band that can be supported by the connected wireless power receiver. Therefore, the wireless power transmitter according to an embodiment of the present disclosure may interrupt or pass power signals of various operating frequency bands without changing the hardware.

While it is illustrated in FIG. 15 that the parallel LC tank 1500 has a structure in which the variable inductor 1510 and the variable capacitor 1520 are connected in parallel, this is merely an example. It should be noted that only one of the variable inductor 1510 and the variable capacitor 1520 may be provided, and the other components may be configured as an inductor or capacitor which is not variable.

Figure 16:
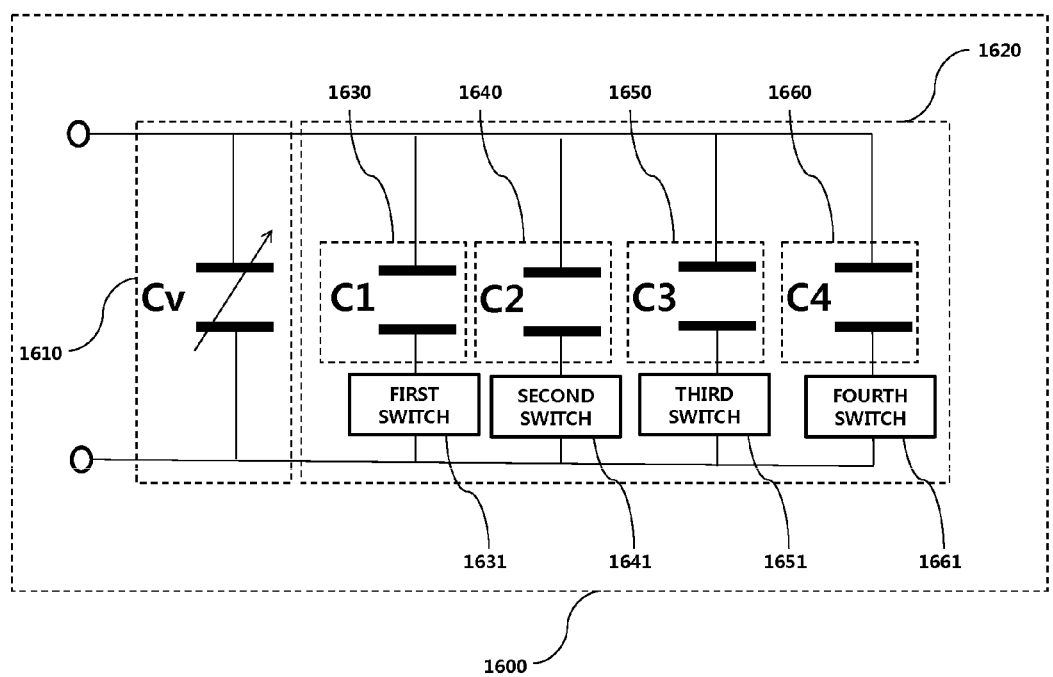
FIG. 16 is an equivalent circuit diagram of a variable capacitor according to an embodiment of the present disclosure.

FIG. 16 is an equivalent circuit diagram of a variable capacitor according to an embodiment of the present disclosure.

Referring to FIG. 16, the variable capacitor 1600 may include a capacitor part 1610 and a variable part 1620.

Cv denotes a capacitance value of the capacitor part 1610 and C1, C2, C3 and C4 denote capacitance values of first to fourth unit capacitors 1630, 1640, 1650 and 1660 included in the variable part 1620.

Cv may be changed through first to fourth switches 1631, 1641, 1651, and 1661 included in the variable part 1620. For example, when only the first switch 1631 is closed and the second to fourth switches 1641, 1651, and 1661 are opened, Cv may be determined by C1 of the first unit capacitor 1630.

While it is illustrated in the embodiment of FIG. 16 that the variable part 1620 includes four unit capacitors and four switches, this is merely an example. It should be noted that the number of the unit capacitors 1620 and the switches included in the variable part 1620 may vary depending on the design of the wireless power transmitter and the variable range thereof.

Figure 17:
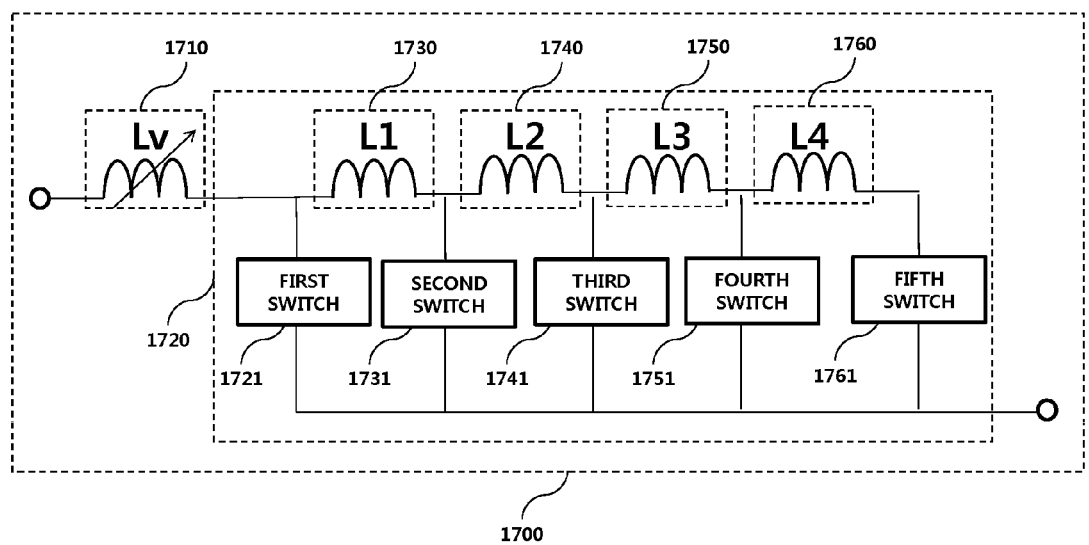
FIG. 17 is an equivalent circuit diagram of a variable inductor according to an embodiment of the present disclosure.

FIG. 17 is an equivalent circuit diagram of a variable inductor according to an embodiment of the present disclosure.

Referring to FIG. 17, a variable inductor 1700 may include an inductor part 1710 and a variable part 1720.

Lv denotes an induction value of the inductor part 1710, and L1, L2, L3 and L4 denote inductance values of first to fourth unit inductors 1730, 1740, 1750 and 1760 included in the variable part 1720, respectively.

Lv may be changed through first to fifth switches 1721, 1731, 1741, 1751 and 1761 included in the variable part 1720. For example, when the first switch 1721 and the second switch 1731 are closed and the third to fifth switches 1741, 1751, and 1761 are opened, Lv may be determined by L1 of the first unit inductor 1730.

While it is illustrated in the embodiment of FIG. 17 that the variable part 1720 has four unit inductors and five switches, this is merely an example. It should be noted that the number of unit inductors and switches included in the variable part 1720 may depend on the shape of the wireless power transmitter and the design of the variable range.

Figure 18:
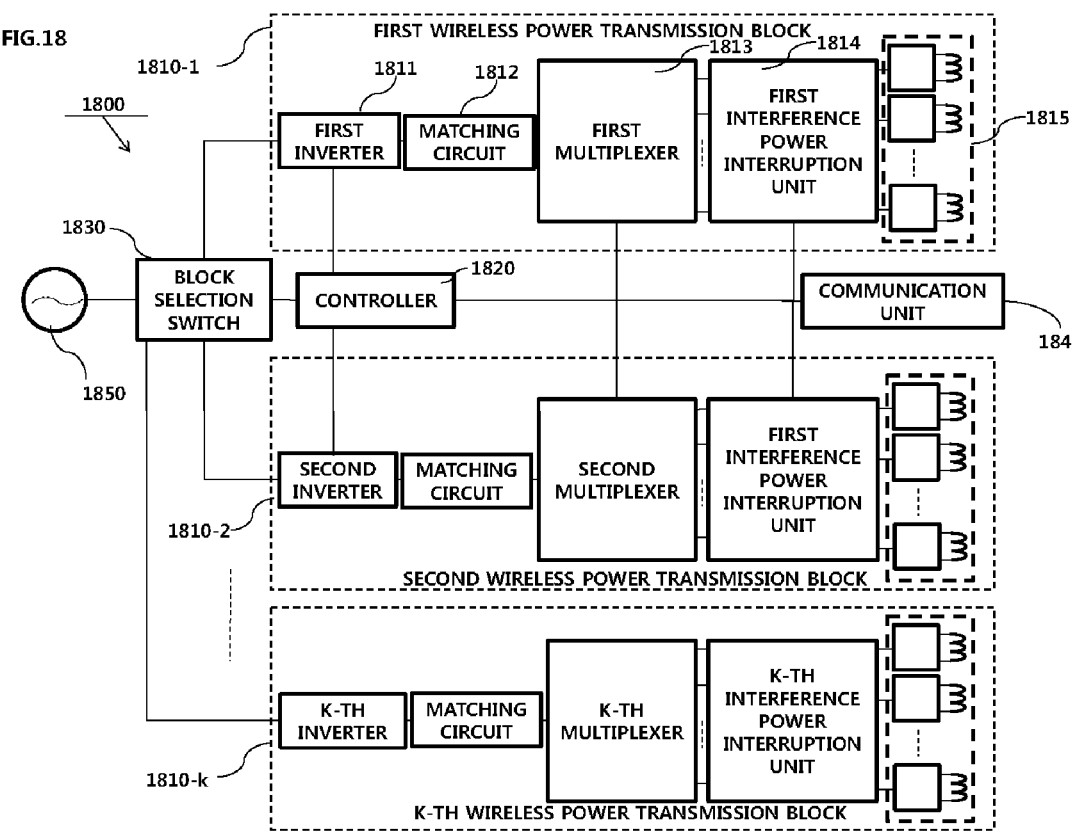
FIG. 18 is a block diagram illustrating the structure of a wireless power transmitter according to another embodiment of the present disclosure.

FIG. 18 is a block diagram illustrating the structure of a wireless power transmitter according to another embodiment of the present disclosure.

Referring to FIG. 18, a wireless power transmitter 1800 according to this embodiment may include first to k-th wireless power transmission blocks 1810-1 to 1810-*k*, a controller 1820, a block selection switch 1830, and a communication unit 1840.

It should be noted that each wireless power transmission block may be designed to support a different wireless power transmission mode, and the detailed configurations of the respective wireless power transmission blocks may partially differ from each other according to the wireless power transmission modes provided by the respective wireless power transmission blocks, as illustrated in FIGS. 1 to 17.

As shown in FIG. 18, the first wireless power transmission block 1810-1 may include a first inverter 1811, a matching circuit 1812, a first multiplexer 1813, a first interference power interruption unit 1814, and a first transmission coil unit 1815.

It should be noted that the number and type of coils included in the transmission coil unit included in each wireless power transmission block may differ depending on the wireless power transmission mode supported by the corresponding wireless power transmission block.

It should be noted that the detailed configuration of the multiplexer and the configuration of the interference power interruption unit may differ depending on the wireless power transmission mode supported by each wireless power transmission block.

It should also be noted that, depending on the wireless power transmission mode supported by each wireless power transmission block, some wireless power transmission blocks may not include the interference power interruption unit and/or the multiplexer.

It should also be noted that the operating frequencies may differ from each other depending on the wireless power transmission modes supported by the respective wireless power transmission blocks, and thus the detailed configuration of at least one of the inverter, the matching circuit, the multiplexer, the interference power interruption unit, and the transmission coil unit may differ among the wireless power transmission blocks.

It should also be noted that, even if the same wireless power transmission mode is supported by the wireless power transmission blocks, different operating frequencies may be given to the wireless power transmission blocks, and thus the detailed configuration of at least one of the inverter, the matching circuit, the multiplexer, the interference power interruption unit, and the transmission coil unit may differ among the wireless power transmission blocks. For example, in the case where the wireless power transmission modes corresponding to two wireless power transmission blocks are both the electromagnetic induction mode, if different standards are supported by the wireless power transmission blocks, the wireless power transmission blocks may operate in different operating frequency bands. Similarly, in the case where the wireless power transmission modes corresponding to two wireless power transmission blocks are both the electromagnetic resonance mode, if different standards are supported by the wireless power transmission blocks, the wireless power transmission blocks may operate in different operating frequency bands.

While it is illustrated in FIG. 18 that a single communication unit 1840 is provided, this is merely an example. According to another embodiment of the present disclosure, it should be noted that the communication unit 1840 may be configured for each wireless power transmission mode or for each wireless power transmission block.

The controller 1820 may control the block selection switch 1830 to select a wireless power transmission block to be supplied with power 1850 from among the first to k-th wireless power transmission blocks 1810-1 to 1810-*k*.

Hereinafter, operation of the wireless power transmitter 1800 will be described in detail focusing on the first wireless power transmission block 1810-1.

When the position of a wireless power receiver is sensed through a position sensor (not shown), the controller 1820 may control the first multiplexer 1813 based on the sensed position to select a coil to which the output power signal of the matching circuit 1812 is to be supplied. That is, the first multiplexer 1813 may include a circuit for controlling the power signal to be supplied to only a coil used for wireless power transmission.

The first interference power interruption unit 1814 may include a circuit for blocking power signals sent by the second to k-th wireless power transmission blocks 1810-2 to 1810-*k* from being coupled to the first transmission coil unit 1815 and introduced into the internal circuit. The first interference power interruption unit 1814 may be the resonant power interruption circuit 1214 or the inductive power interruption circuit 1223 of FIG. 12 described above depending on the wireless power transmission mode supported by the first wireless power transmission block 1810-1.

It is apparent to those skilled in the art that the present disclosure may be embodied in specific forms other than those set forth herein without departing from the spirit and essential characteristics of the present disclosure. Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

The method according to an embodiment of the present disclosure may be embodied as a program to be executed on a computer and stored in a computer-readable recording medium. Examples of the computer-readable recording medium include ROM, RAM, CD-ROM, magnetic tapes, floppy disks, and optical data storage devices, and also include carrier-wave type implementation (e.g., transmission over the Internet).

The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

It is apparent to those skilled in the art that the present disclosure may be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

INDUSTRIAL APPLICABILITY

The present disclosure relates to a wireless charging technique, and may be applied to a wireless power transmission device that supports both inductive and resonant wireless power transmission schemes and a wireless charging system using the same.

The invention claimed is:

1. A wireless power transmitter supporting a plurality of wireless power transmission modes, comprising:
    a first transmitter configured to transmit a first power signal corresponding to a first wireless power transmission mode;
    a second transmitter configured to transmit a second power signal corresponding to a second wireless power transmission mode; and
    a first power interruption circuit coupled to the first transmitter to interrupt introduction of the second power signal and to pass the first power signal,
    wherein the first power interruption circuit comprises at least one parallel LC tank comprising an inductor and a capacitor connected in parallel.

2. The wireless power transmitter according to claim 1, wherein the first wireless power transmission mode is a mode for transmitting wireless power using an electromagnetic induction scheme and the second wireless power transmission mode is a mode for transmitting wireless power using an electromagnetic resonance scheme.

3. The wireless power transmitter according to claim 1, wherein the first wireless power transmission mode is a mode for transmitting wireless power using an electromagnetic resonance scheme and the second wireless power transmission mode is a mode for transmitting wireless power using an electromagnetic induction scheme.

4. The wireless power transmitter according to claim 1, further comprising, when a plurality of transmission coils is provided in the first transmitter, switches corresponding to the number of the transmission coils,
    wherein the parallel LC tank is connected to one end of the transmission coils and the switches are connected to an opposite end of the transmission coils.

5. The wireless power transmitter according to claim 1, wherein the first power interruption circuit comprises a bandpass filter configured to interrupt a power signal in an operating frequency band used in the second transmitter and to pass a power signal in an operating frequency band used in the first transmitter.

6. The wireless power transmitter according to claim 1, wherein the parallel LC tank comprises a variable parallel LC tank configured to change an operating frequency band.

7. The wireless power transmitter according to claim 1, further comprising:
    a second power interruption circuit configured to interrupt the first power signal coupled to the second transmitter and introduced and to pass the second power signal,
    wherein the second power interruption circuit comprises at least one parallel LC tank comprising an inductor and a capacitor connected in parallel.

8. The wireless power transmitter according to claim 1, further comprising:
    a position sensor configured to sense a position of a wireless power receiver;
    a controller configured to determine a wireless power transmission mode for the sensed wireless power receiver; and
    a mode selection switch configured to supply power to a transmitter corresponding to the determined wireless power transmission mode according to a control signal of the controller.

9. The wireless power transmitter according to claim 8, further comprising a communication unit configured to receive state and characteristics information from the sensed wireless power receiver, wherein the wireless power transmission mode for the sensed wireless power receiver is determined based on the state and characteristics information.

10. A wireless power transmitter comprising:
    a controller;
    first to k-th wireless power transmission blocks each comprising an interference power interruption unit configured to prevent a power signal transmitted by another wireless power transmission block from being coupled through a transmission coil provided in its wireless power transmission block and introduced into an internal circuit; and
    a block selection switch configured to supply power to at least one of the first to k-th wireless power transmission blocks according to a control signal of the controller,
    wherein the interference power interruption unit comprises at least one parallel LC tank comprising an inductor and a capacitor connected in parallel.

11. The wireless power transmitter according to claim 10, further comprising, when a plurality of transmission coils is provided in each of the wireless power transmission blocks, switches corresponding to the number of the transmission coils,
    wherein the parallel LC tank is connected to one end of the transmission coils and the switches are connected to an opposite end of the transmission coils.

12. The wireless power transmitter according to claim 10, wherein the parallel LC tank comprises a variable parallel LC tank configured to change an operating frequency band.

13. The wireless power transmitter according to claim 12, wherein a value of at least one of an inductor and a capacitor of the variable parallel LC tank connected in parallel is changed.

14. The wireless power transmitter according to claim 10, wherein each of the wireless power transmission blocks further comprises:
    an inverter configured to change an intensity of the power signal transmitted according to a control signal of the controller;
    a transmission coil unit having a plurality of transmission coils for wirelessly transmitting the power signal; and
    a multiplexer configured to multiplex the power signal received from the inverter to the plurality of transmission coils.

15. A method for wireless power transmission in a wireless power transmitter having first and second transmitters, the method comprising:
    sensing a position of a wireless power receiver in a charging area;
    transmitting a first power signal using a transmission coil of the first transmitter corresponding to the sensed position; and
    interrupting the first power signal introduced into the second transmitter, wherein the first power signal is introduced into the second transmitter by being coupled through a transmission coil of the second transmitter, and wherein the first power signal introduced into the second transmitter is interrupted using at least one parallel LC tank having an inductor and a capacitor connected in parallel.

16. The method according to claim 15, wherein an inductance value of the inductor and a capacitance value of the capacitor are set to pass a second power signal transmitted by the second transmitter and to interrupt the first power signal.

17. The method according to claim 15, further comprising:

transmitting a second power signal using the second transmitter corresponding to the sensed position; and interrupting the second power signal introduced into the first transmitter, wherein the second power signal is introduced into the first transmitter by being coupled through the transmission coil of the first transmitter.

* * * * *